United States Patent
Karube et al.

(10) Patent No.: US 9,690,088 B2
(45) Date of Patent: Jun. 27, 2017

(54) MAGNIFYING OBSERVATION APPARATUS, MAGNIFIED IMAGE OBSERVING METHOD AND COMPUTER-READABLE RECORDING MEDIUM

(71) Applicant: Keyence Corporation, Osaka (JP)

(72) Inventors: Takuya Karube, Osaka (JP); Suguru Sekiya, Osaka (JP); Masahiro Inomata, Osaka (JP)

(73) Assignee: Keyence Corporation, Osaka (JP)

( * ) Notice: Subject to any disclaimer, the term of this patent is extended or adjusted under 35 U.S.C. 154(b) by 296 days.

(21) Appl. No.: 14/551,101

(22) Filed: Nov. 24, 2014

(65) Prior Publication Data

US 2015/0185464 A1   Jul. 2, 2015

(30) Foreign Application Priority Data

Dec. 27, 2013  (JP) ................. 2013-273613

(51) Int. Cl.
| | |
|---|---|
| G02B 21/36 | (2006.01) |
| G02B 21/00 | (2006.01) |
| G02B 21/06 | (2006.01) |
| G02B 21/08 | (2006.01) |
| H04N 13/02 | (2006.01) |

(52) U.S. Cl.
CPC ....... *G02B 21/367* (2013.01); *G02B 21/0016* (2013.01); *G02B 21/06* (2013.01); *G02B 21/082* (2013.01); *G02B 21/084* (2013.01); *H04N 13/0275* (2013.01)

(58) Field of Classification Search
CPC .. G02B 21/367; G02B 21/0016; G02B 21/06; G02B 21/082; G02B 21/084; H04N 13/0275
See application file for complete search history.

(56) References Cited

U.S. PATENT DOCUMENTS 6,259,473 B1 *  7/2001  Iko .................. G01N 23/04
                                              348/80
2005/0237604 A1 * 10/2005  Kawano ........... G02B 21/0012
                                              359/368

(Continued)

FOREIGN PATENT DOCUMENTS

| JP | 2001-059599 | 3/2001 |
|---|---|---|
| JP | 2004-151303 | 5/2004 |

(Continued)

*Primary Examiner* — Thai Tran
*Assistant Examiner* — Christopher T Braniff
(74) *Attorney, Agent, or Firm* — Kilyk & Bowersox, P.L.L.C.

(57) ABSTRACT

The present invention is for saving the time of searching a visual field to be observed and observing a synthetic image. A magnifying observation apparatus includes a controller configured to set an imaging condition, to generate a first image to be displayed in a first display mode by performing a first image processing on the image acquired on the imaging condition, to generate a second image to be displayed in a second display mode by performing a second image processing on the image, to detect an image changing operation including at least one of changing of the imaging condition and changing of a visual field, and to switch from the first display mode to the second display mode in response to detect the image changing operation.

15 Claims, 21 Drawing Sheets

(56) References Cited

U.S. PATENT DOCUMENTS

| | | |
|---|---|---|
| 2008/0297596 A1 | 12/2008 | Inomata et al. |
| 2008/0297597 A1 | 12/2008 | Inomata et al. |
| 2010/0103254 A1* | 4/2010 | Okamoto ............ G02B 21/0088 348/79 |
| 2010/0149362 A1 | 6/2010 | Kang |
| 2010/0149363 A1 | 6/2010 | Inomata et al. |
| 2010/0149364 A1 | 6/2010 | Kang |
| 2012/0019626 A1* | 1/2012 | Hou .................... G01N 21/956 348/50 |
| 2013/0050464 A1 | 2/2013 | Kang |
| 2013/0088586 A1 | 4/2013 | Sekiya et al. |
| 2013/0093872 A1 | 4/2013 | Kang |
| 2013/0100170 A1 | 4/2013 | Matsumura et al. |
| 2013/0222569 A1* | 8/2013 | Kawakami ........... G02B 21/086 348/79 |

FOREIGN PATENT DOCUMENTS

| | | |
|---|---|---|
| JP | 2004-153462 | 5/2004 |
| JP | 2004-170574 | 6/2004 |
| JP | 2006-030969 | 2/2006 |
| JP | 2006-308808 | 11/2006 |
| JP | 2006-337470 | 12/2006 |
| JP | 2006-337471 | 12/2006 |
| JP | 2008-299711 | 12/2008 |
| JP | 2008-301331 | 12/2008 |
| JP | 2008-301332 | 12/2008 |
| JP | 2009-128726 | 6/2009 |
| JP | 2009-128881 | 6/2009 |
| JP | 2010-130408 | 6/2010 |
| JP | 2010-139890 | 6/2010 |
| JP | 2010-141697 | 6/2010 |
| JP | 2010-141698 | 6/2010 |
| JP | 2010-141699 | 6/2010 |
| JP | 2010-141700 | 6/2010 |
| JP | 2011-259502 | 12/2011 |
| JP | 2011-259503 | 12/2011 |
| JP | 2011-259504 | 12/2011 |
| JP | 2012-145722 | 8/2012 |
| JP | 2013-050594 | 3/2013 |
| JP | 2013-083743 | 5/2013 |
| JP | 2013-088530 | 5/2013 |
| JP | 2013-088676 | 5/2013 |

* cited by examiner

FIG. 12

| R |  | G |  | R |  | G |
|---|---|---|---|---|---|---|
|   |   |   |   |   |   |   |
| G |  | B |  | G |  | B |
|   |   |   |   |   |   |   |
| R |  | G |  | R |  | G |
|   |   |   |   |   |   |   |
| G |  | B |  | G |  | R |

FIG. 13

| RGBG |  | GRGB |  | RGBG |  | GRGB |
|------|---|------|---|------|---|------|
|      |   |      |   |      |   |      |
| GBGR |  | BGRG |  | GBGR |  | BGRG |
|      |   |      |   |      |   |      |
| RGBG |  | GRGB |  | RGBG |  | GRGB |
|      |   |      |   |      |   |      |
| GBGR |  | BGRG |  | GBGR |  | BGRG |

FIG. 14

| RGBG | RGBG | GRGB | GRGB | RGBG | RGBG | GRGB |
|------|------|------|------|------|------|------|
| RGBG | RGBG | GRGB | GRGB | RGBG | RGBG | GRGB |
| GBGR | GBGR | BGRG | BGRG | GBGR | GBGR | BGRG |
| GBGR | GBGR | BGRG | BGRG | GBGR | GBGR | BGRG |
| RGBG | RGBG | GRGB | GRGB | RGBG | RGBG | GRGB |
| RGBG | RGBG | GRGB | GRGB | RGBG | RGBG | GRGB |
| GBGR | GBGR | BGRG | BGRG | GBGR | GBGR | BGRG |

MAGNIFYING OBSERVATION APPARATUS, MAGNIFIED IMAGE OBSERVING METHOD AND COMPUTER-READABLE RECORDING MEDIUM

CROSS-REFERENCE TO RELATED APPLICATIONS

The present application claims foreign priority based on Japanese Patent Application No. 2013-273613, filed Dec. 27, 2013, the contents of which is incorporated herein by reference.

BACKGROUND OF THE INVENTION

1. Field of the Invention

The present invention relates to a magnifying observation apparatus such as a digital microscope or a microscope which captures and displays a magnified image, a magnified image observing method, a magnified image observing program, and a computer-readable recording medium.

2. Description of Related Art

As a magnifying observation apparatus that magnifies and displays an image of a subject being a specimen such as a micro-object, a workpiece or the like, there has been used an optical microscope, a digital microscope or the like which uses an optical lens. In the digital microscope, reflected light or transmitted light which is incident via an optical system and comes from an observation target fixed to an observation target fixing section is received with an imaging element such as a CCD or a CMOS where the light is electrically read at each of two-dimensionally arranged pixels, and the electrically read image is displayed on a display section such as a display (e.g., JP 2012-145722 A, JP 2004-170574 A).

Some of such magnifying observation apparatuses are provided with a function (synthetic image mode) of synthesizing an image from a plurality of images. For example, out of a plurality of images photographed as a focus position is changed, only focused portions are synthesized from focus information, to obtain an image with a large depth of focus (synthetic depth image) with respect to an image with a small depth of focus. Further, there is known a technique of acquiring an image with resolution increased by a so-called super-resolution technique, or an image with a widened dynamic range. Since such a synthetic image is generated from a plurality of images, it requires considerably long processing time. For this reason, for generating and displaying the synthetic image, it is difficult to keep displaying on the display section a real time image (a live picture or a moving image) with a high frame rate, and hence the frame rate is significantly lowered or the image is displayed as a still image.

While each of these synthetic images is displayed, a display content on the display section is the still image or is in the state of having an extremely slow frame rate. For this reason, when another portion is to be observed, it is of necessity to once discard the still image and switch the display content on the display section to a through image mode for displaying a live picture. That is, the user has been required to perform an operation of switching display on the display section from the still image to the moving image.

Further, in a state where the live picture is displayed on the display section with the frame rate of the imaging element set to high, a user searches a portion to be observed while referring to the display section, to decide a visual field. Then in a state where the desired portion has been decided, since the live picture remains displayed, synthesis processing needs to be executed again for this portion. That is, it has been necessary to perform an operation of performing switching to the synthetic image mode and change the display content on the display section from the live picture to the still image. As thus described, since an image required at the time of performing the synthesis processing required for observation is different from that required at the time of searching the desired portion, the user is forced to perform an operation of turning on/off the synthetic image mode and switching the display content each time, which has caused a problem of making the operation extremely complicated.

SUMMARY OF THE INVENTION

The present invention has been made for solving the conventional problems as described above. A principal object of the present invention is to provide a magnifying observation apparatus, a magnified image observing method, a magnified image observing program, and a computer-readable recording medium, each of which saves time and labor for performing a switching operation for a display section at the time of searching a visual field to be observed and observing a synthetic image.

In order to achieve the above object, according to one embodiment of the present invention, there is provided a magnifying observation apparatus capable of capturing an image of an imaging target by irradiating the imaging target with illumination light, and detecting a light reception amount of reflected light or transmitted light of the illumination light. The apparatus includes: a placement section for placing an observation target; an illumination unit for irradiating the observation target with illumination light; an imaging unit for receiving reflected light or transmitted light of the illumination light applied by the illumination unit; an imaging condition setting section for setting an imaging condition at the time of capturing an image by the imaging unit; an image processing unit for performing predetermined image processing on the image captured on the imaging condition set by the imaging condition setting section; and a display section for displaying the image subjected to the image processing in the image processing unit. The apparatus includes, as display modes for displaying an image on the display section: a first display mode for displaying a first display mode image subjected to the predetermined image processing in the image processing unit; and a second display mode for displaying a second display mode image with lighter processing load than that of the image processing in the first display mode. The apparatus may further include: an image changing unit for accepting an image changing operation of making a change to the image acquired in the imaging unit in a state where the first display mode image subjected to the image processing in the first display mode is displayed on the display section; and a display mode switching unit for automatically switching display on the display section from the first display mode to the second display mode upon execution of the image changing operation in the image changing unit in a state where the display mode on the display section is the first display mode. With the above configuration, upon detection that the operation of making a change to the image has been performed by the user, the display content on the display section is automatically switched from the first display mode image to the second display mode image with a lighter load. Therefore, while a load of image processing is reduced to allow real time updating, the need for an operation of manually switching display on the display section by the user, as has hitherto been performed, is eliminated, thereby to realize an operating environment with improved operability and good usability.

Moreover, in the magnifying observation apparatus according to another embodiment of the present invention, the display mode switching unit may be configured to switch the display mode on the display section from the second display mode to the first display mode on the timing of the image processing unit performing the image processing. With the above configuration, since the display on the display section can be automatically switched to the first display mode at the time of displaying the image subjected to the image processing, it is possible for the user to promptly obtain a display content in accordance with an operation content without being conscious of the switching operation for the display mode on the display section, leading to improvement in operability.

Moreover, in the magnifying observation apparatus according to still another embodiment of the present invention, the first display mode may be display of a moving image at a first frame rate, and the second display mode may be display of a moving image at a second frame rate which is higher than the first frame rate.

Moreover, in the magnifying observation apparatus according to still another embodiment of the present invention, the first display mode may be display of a still image, and the second display mode may be display of a moving image.

Moreover, in the magnifying observation apparatus according to still another embodiment of the present invention, the image changing operation may be at least any of relative movement or rotation of the placement section and the imaging unit, inclination of the imaging unit, changing of an imaging condition by the imaging condition setting section, and changing of an image processing condition performed in the image processing unit.

Moreover, in the magnifying observation apparatus according to still another embodiment of the present invention, the image changing operation may be at least any of adjustment of a shutter speed or exposure time of the imaging unit, adjustment of a gain, application or non-application of edge enhancement, changing of a white balance, and selection of a size of an image and of a kind of illumination light from the illumination unit.

Moreover, the magnifying observation apparatus according to still another embodiment of the present invention may further include a magnification adjusting unit for increasing or decreasing a display magnification of an image displayed on the display section, wherein the image changing operation may include a magnification changing operation by the magnification adjusting unit.

Moreover, the magnifying observation apparatus according to still another embodiment of the present invention may further include a visual field moving unit for changing a visual field of an image display on the display section, wherein, upon detection of movement of the visual field by the visual field moving unit, the display mode switching unit may automatically switch the display mode on the display section from the first display mode to the second display mode.

Moreover, the magnifying observation apparatus according to still another embodiment of the present invention may further include, as the visual field moving unit: a z-axis movement mechanism capable of adjusting a relative distance between the placement section and the imaging unit; and an xy-axis movement mechanism capable of changing relative positions of the placement section and the imaging unit, wherein the image changing operation may include a movement operation by the z-axis movement mechanism or the xy-axis movement mechanism.

Moreover, in the magnifying observation apparatus according to still another embodiment of the present invention, the image processing unit may be an image synthesizing unit for generating a synthetic image obtained by synthesizing a plurality of images each captured at a different position and a relative distance due to the z-axis movement mechanism and/or the xy-axis movement mechanism, and the first display mode may be display of the synthetic image.

Moreover, in the magnifying observation apparatus according to still another embodiment of the present invention, a synthetic image displayed in the first display mode may be any of a depth synthetic image, a 3D synthetic image, a pixel shifting image, a super-resolution image and an HDR image.

Moreover, in the magnifying observation apparatus according to still another embodiment of the present invention, the second display mode may be any of display of a moving image, a through image and a simple synthetic image.

Moreover, the magnifying observation apparatus according to still another embodiment of the present invention may further include: a first objective lens section which is optically bonded with the imaging unit by matching optical axes thereof, and having a first magnification; a second objective lens section which is optically bonded with the imaging unit by matching optical axes thereof, and having a higher magnification than the first magnification; and an objective lens switching unit for switching one of the first objective lens section and the second objective lens section to a position matched with the optical axis of the imaging unit, wherein the image changing operation may include an operation of switching the objective lens.

Moreover, the magnifying observation apparatus according to still another embodiment of the present invention may further include a head inclining mechanism capable of inclining the imaging unit with respect to the placement section in a vertical plane, wherein the image changing operation may include an operation of inclining the imaging unit by the head inclining mechanism.

Moreover, according to still another embodiment of the present invention, there is provided a magnified image observing method for displaying an image of an imaging target by irradiating the imaging target with illumination light and detecting a light reception amount of reflected light or transmitted light of the illumination light. The method may include the steps of irradiating an observation target with illumination light or transmitted light, and capturing an image by an imaging unit to display on a display section a first display mode image generated by performing predetermined image processing; detecting that an image changing operation is performed in an image changing unit for accepting an image changing operation of making a change to the image acquired in the imaging unit in a state where the first display mode image is displayed on the display section; and automatically switching display on the display section from the first display mode image to a second display mode image with a lighter processing load than that of the first display mode image upon detection of the image changing operation. Herewith, upon detection that the operation of making a change to the image has been performed by the user, the display content on the display section is automatically switched from the first display mode image to the second display mode image with a lighter load. Therefore, while a processing load is reduced to allow real time updating, the need for an operation of manually switching display on the display section by the user, as has hitherto been performed, is eliminated, thereby to realize an operating environment with improved operability and good usability.

Moreover, according to still another embodiment of the present invention, there is provided a magnified image observing program for displaying an image of an imaging target by irradiating the imaging target with illumination light and detecting a light reception amount of reflected light or transmitted light of the illumination light. The program causes a computer to realize the functions of; irradiating an observation target with illumination light or transmitted light, and capturing an image by an imaging unit to display on a display section a first display mode image generated by performing predetermined image processing; detecting that an image changing operation is performed in an image changing unit for accepting an image changing operation of making a change to the image acquired in the imaging unit in a state where the first display mode image is displayed on the display section; and automatically switching display on the display section from the first display mode image to a second display mode image with a lighter processing load than that of the first display mode image upon detection of the image changing operation.

Moreover, a computer-readable recording medium or a recording device according to still another embodiment of the present invention records the above program. The recording medium includes a magnetic disk, an optical disk, a magneto-optical disk, a semiconductor memory, and other program-storable medium, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (registered trademark), and an HD-DVD (AOD). Further, the program includes a program in the form of being distributed by downloading through a network such as the Internet, in addition to a program stored into the above recording medium and distributed. Moreover, the recording medium includes a device capable of recording a program, such as a general-purpose or special-purpose device placed with the program in the form of software, firmware or the like, in an executable state. Furthermore, each processing and each function included in the program may be executed by program software that is executable by the computer, and processing of each section may be realized by predetermined hardware such as a gate array (FPGA, ASIC) or in the form of program software being mixed with a partial hardware module that realizes some element of hardware.

BRIEF DESCRIPTION OF THE DRAWINGS

FIG. 12 is a plan view showing a Bayer array of imaging elements;

FIG. 13 is a plan view showing the situation of performing shifting by 1 pixel and acquiring RGB data at each pixel;

FIG. 14 is a plan view showing the situation of performing shifting by one-half of the pixel further from FIG. 13 and acquiring RGB data by a subpixel unit;

DETAILED DESCRIPTION OF PREFERRED EMBODIMENTS

Figure 1:
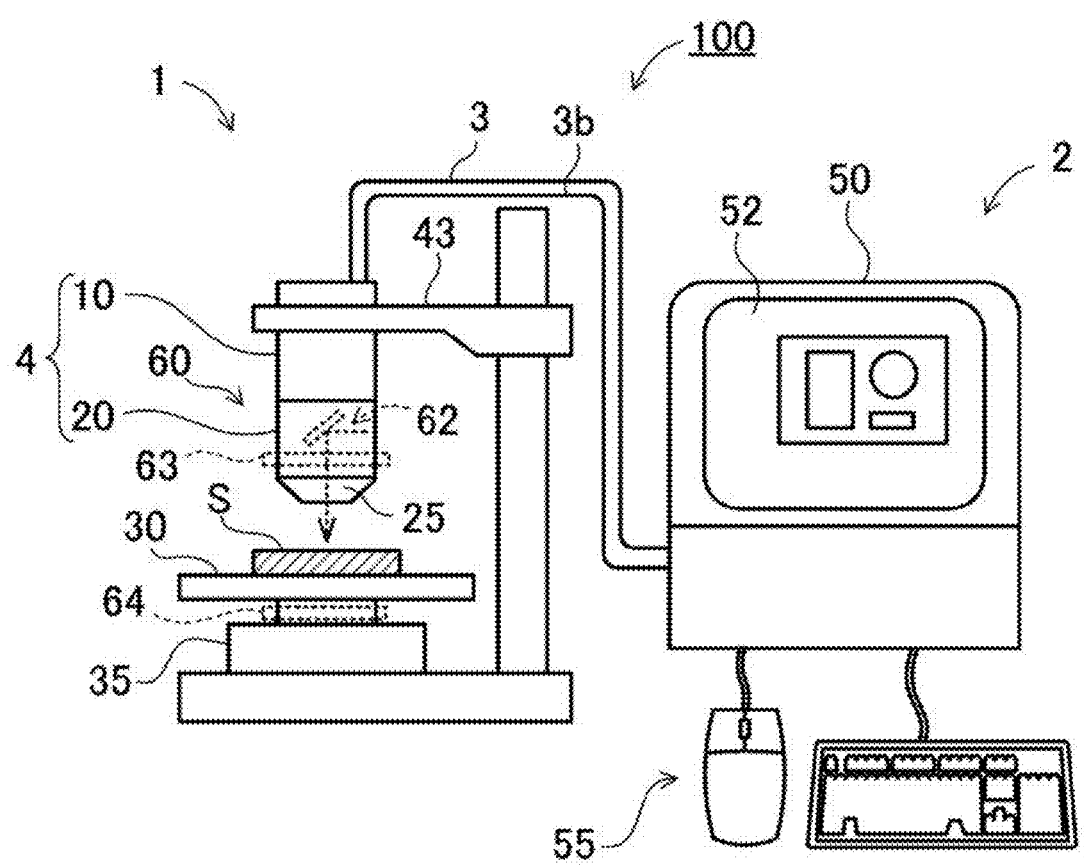
FIG. 1 is an external view of a magnifying observation apparatus according to one embodiment of the present invention.

Hereinafter, an embodiment of the present invention will be described based on the drawings. However, the embodiment shown hereinafter merely illustrates a magnifying observation apparatus, a magnified image observing method, a magnified image observing program, and a computer-readable recording medium for the purpose of embodying technical ideas of the present invention, and the present invention does not specify the magnifying observation apparatus, the magnified image observing method, the magnified image observing program, and the computer-readable recording medium to those described below. Further, the present specification does not specify members shown in the claims to members of the embodiment. Especially, sizes, materials, shapes, relative disposition and the like of constituent components described in the embodiment are not intended to restrict the scope of the present invention thereto, but are mere explanatory examples unless otherwise specified. It is to be noted that sizes, positional relations and the like of members shown in each of the drawings may be exaggerated for clarifying a description. Further, in the following description, the same name and symbol denote the same member or members of the same quality, and a detailed description thereof will be omitted as appropriate. Moreover, each element constituting the present invention may have a mode where a plurality of elements are configured of the same member and the one member may serve as the plurality of elements, or conversely, a function of one member can be shared and realized by a plurality of members.

A magnifying observation apparatus used in the embodiment of the present invention and a computer, a printer, an external storage apparatus and other peripheral devices, which are connected to the magnifying observation apparatus and serve for an operation, control, display and other processing and the like, are communicated as electrically, magnetically or optically connected by serial connection or parallel connection such as IEEE 1394, RS-232x, RS-422, or USB or via a network such as 10BASE-T, 100BASE-TX or 1000BASE-T. The connection is not restricted to physical connection using a wire, but it may be wireless connection through use of a wireless LAN such as IEEE802.x, a radio wave such as Bluetooth (registered trademark), infrared rays, optical communication, or the like. Further, a memory card, a magnetic disk, an optical disk, a magneto-optic disk, a semiconductor memory or the like can be used as a recording medium for exchanging data, storing a setting, and the like. It is to be noted that in the present specification, the magnifying observation apparatus and the magnified image observing method are used in the meaning of including not only a body of the magnifying observation apparatus but also a magnifying observation system formed by combining the body with a computer and a peripheral device such an external storage apparatus.

Moreover, in the present specification, the magnifying observation apparatus is not restricted to the system itself for performing magnifying observation, and to an apparatus and a method for performing, in hardware, input/output, display, computing, communication and other processing which are related to imaging. An apparatus and a method for realizing processing in software are also included in the scope of the present invention. For example, an apparatus and a system, where software, a program, plug-in, an object, a library, an applet, a compiler, a module, a macro operated in a specific program, or the like is incorporated into a general-purpose circuit or a computer to allow imaging itself or processing related thereto, also correspond to the magnifying observation apparatus of the present invention. Further, in the present specification, the computer includes a work station, a terminal or other electronic devices in addition to a general-purpose or dedicated electronic calculator. Moreover, in the present specification, the program is not restricted to a program that is singly used, but can be used in the mode of functioning as part of a specific computer program, software, service or the like, in the mode of being called in time of need and functioning, in the mode of being provided as a service in an environment such as an operating system, in the mode of operating by being resident in an environment, in the mode of operating on a background, or in a position of another support program.

Hereinafter, using FIGS. 1 and 2, a magnifying observation apparatus 100 according to one embodiment of the present invention will be described. As shown in FIG. 1, the magnifying observation apparatus 100 is broadly divided into an imaging system 1 and a control system 2. The imaging system 1 is provided with an illumination section 60 for illuminating a specimen, a workpiece or another subject as an observation target S, and a head section 4 for capturing an image of the observation target S illuminated by the illumination section 60. The head section 4 is provided with a camera section 10 including an imaging element 12, and a microscope lens section 20 detachably mounted at the tip of the camera section 10. The microscope lens section 20 constitutes an imaging optical system (lens optical system) configured by a plurality of optical lenses. Here, the microscope lens section 20 includes an objective lens section 25. Further, the head section 4 functions as an imaging unit for receiving reflected light or transmitted light of illumination light.

Moreover, the imaging system 1 is provided with: a placement section 30 for placing the observation target S; a z-upper stage as a first focus adjusting section for changing a relative distance between this placement section 30 and the head section 4 in an optical axis direction and adjusting a focus; and an upper stage lift 16 for driving this z-upper stage. Meanwhile, the head section 4 is also provided with a z-upper stage as a second focus adjusting section for changing the relative distance with the placement section in the optical axis direction and adjusting a focus. Reflected light, which is incident on the observation target S placed on the placement section 30 via an imaging optical system 11 and reflected on the observation target S, or transmitted light applied from the bottom surface side of the observation target S, is electrically read in an imaging element 12 of the camera section 10.

Further, the control system 2 is provided with a body section 50 having a display section 52 for displaying a magnified image captured in the camera section 10. The camera section 10 is connected to the body section 50 via a cable section 3. It is to be noted that in the example of FIG. 1, the display section 52 is provided integrally with the body section 50, but the display section may be a separate member from the body section. Further, the cable section 3 is provided with an optical cable 3b for transmitting illumination light from the body section 50 to the head section 4 side in addition to an electrical cable for transmitting image information obtained in the imaging element of the camera section 10 to the body section 50 side. In the cable section 3, the electrical cable and the optical cable 3b can be integrated with each other, or these can be separately provided.

Moreover, the placement section 30 is movable in a plane in addition to being movable in a height direction, namely a z-direction, by a lower stage lift 35. Specifically, an x-y stage movable in an x-axis direction and a y-axis direction is provided. Further, a rotatable stage (θ stage) which is rotatable and rotates the placement section 30 can also be provided.

Figure 2:
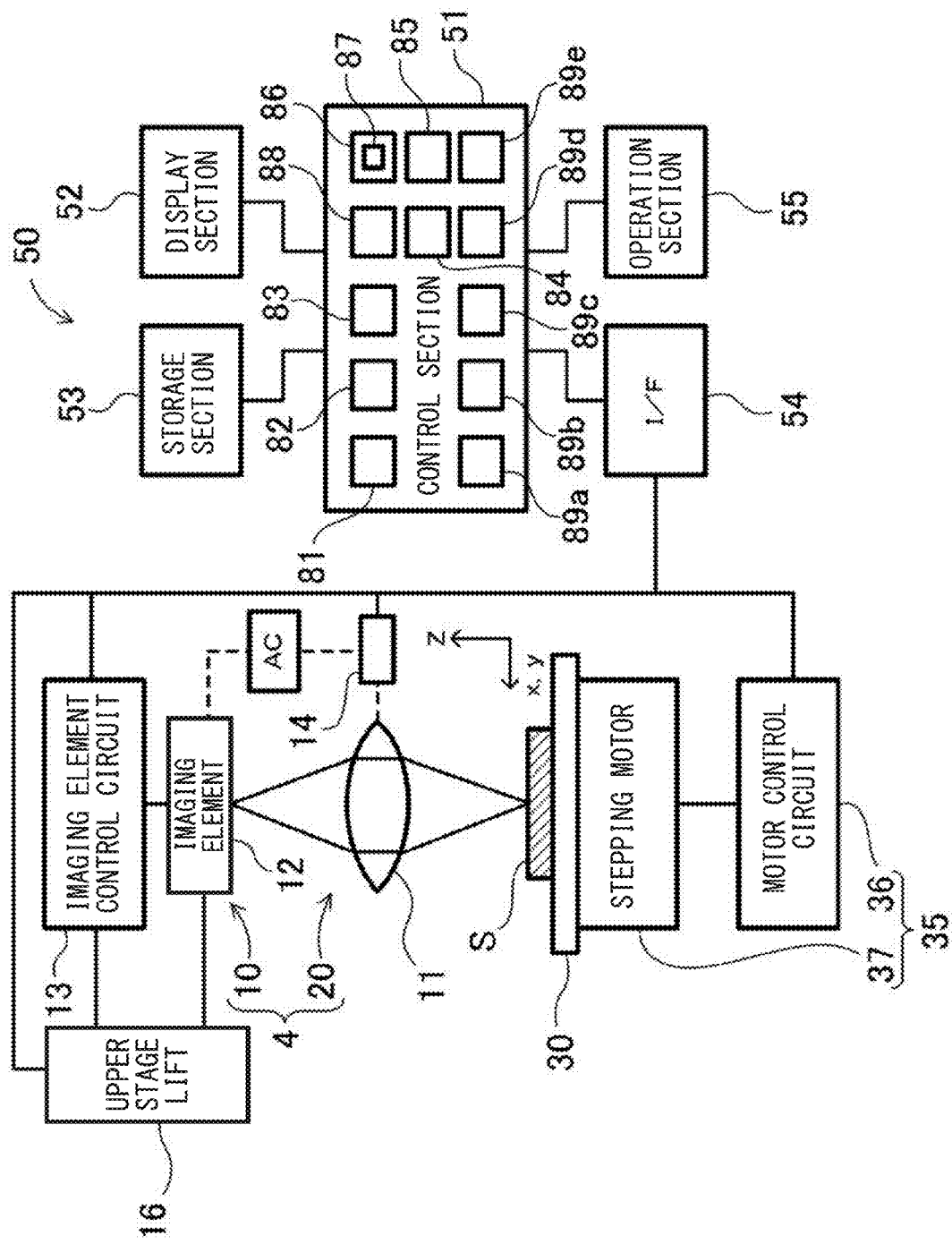
FIG. 2 is a block diagram of the magnifying observation apparatus according to one embodiment of the present invention.

FIG. 2 shows a block diagram of this body section 50. As shown in FIG. 2, the body section 50 is provided with: a storage section 53 as a focus distance information storing section for storing focus distance information related to a relative distance between the placement section 30 and the imaging optical system 11 in the optical axis direction at the time of adjusting a focus by the lower stage lift 35 along with two-dimensional position information of the observation target S in a plane almost vertical to the optical axis direction; the display section 52 for displaying an image read by the imaging element 12; and an interface 54 for performing data communication with the head section 4 and the lower stage lift 35. This magnifying observation apparatus 100 captures an observation image by use of the imaging element 12 for electrically reading reflected light or transmitted light which is incident via the imaging optical system 11 and comes from the observation target S fixed to the placement section 30, and displays the image on the display section 52.

Further, the storage section 53 also functions as a lens identification information storing section for storing lens identification information and lens aberration information, or as a wavelength component storing unit for storing a wavelength component with a small aberration of each lens section in association with the aberration information of the lens section. It is to be noted that the storage section 53 is configured of a hard disk, semiconductor memory or the like. Further, an individual storage section may be provided with respect to each data base.

(Lens Identification Information)

The lens identification information includes a lens type, the position of a focus distance, the length of a lens barrel, and the like. As described above, since the imaging system 1 and the control system 2 are connected via the cable section 3, it is possible to perform appropriate control by discriminating the type of a lens currently mounted in the control system 2. For example, by grasping a physical length of the microscope lens section 20, at the time of lowering the microscope lens section 20 by means of the z-upper stage, it is possible to grasp a lower limit movement distance at which the microscope lens section 20 can be lowered without coming into contact with the observation target S and the placement section 30, and control the lowering so as not to exceed that distance.

Further, in addition to directly recording information of the microscope lens section as lens type information, it is possible to record only identification information of the microscope lens section, such as its type, while previously storing detailed information of the microscope lens section which corresponds to the type into the storage section 53 of the body section 50, or the like, as a look-up table associated with the type. Herewith, when acquiring the type as the lens identification information through the camera section, the body section 50 can acquire detailed information corresponding to this type by referencing the storage section 53, and perform control suitable for the microscope lens section based on the acquired information. With this method, it is possible to grasp necessary information on the body section 50 side while reducing the amount of information to be held on the microscope lens section side.

Further, the magnifying observation apparatus 100 is provided with: an operation section 55 for setting an imaging condition for setting a condition at the time of capturing an image by the camera section 10 and performing other necessary variety of settings and operations; and a control section 51 for computing the height of the observation target S in the optical axis direction which corresponds to a set region based on focus distance information stored in the storage section 53 and related to part or the whole of the observation target S corresponding to the set region. This magnifying observation apparatus 100 can compute an average height (depth) of the observation target S in the optical axis direction which corresponds to a designated region by use of the imaging element 12.

This control section 51 realizes functions such as: an optical path shifting controlling unit 81 for activating an optical path shifting unit 14; an image selecting unit 82 capable of selecting one observation image in a state where a plurality of observation images captured with respect to the same visual field of the observation target S by use of a plurality of illumination filters are simultaneously displayed on the display section 52; an imaging condition setting section 83 for setting as an imaging condition an image observation condition including the type of an illumination filter used for capturing an observation image selected in the image selecting unit 82; an automatic synthesis unit 84 for automatically performing an operation of synthesizing observation images in an image processing unit for performing predetermined image processing and in an image synthesizing unit 85, to acquire a color high-resolution observation image; a waveform selecting unit 86 capable of selecting a waveform component relatively less influenced by an aberration of a currently mounted microscope lens section out of a plurality of wavelength components based on aberration information of the microscope lens section currently mounted in the camera section out of replaceable microscope lens sections with different specifications; an illumination light selecting unit 87 capable of selectively switching to any wavelength region among a plurality of different wavelength regions included in a wavelength band of light emitted by an illumination light source 65; a magnification adjusting unit 89*a* for increasing or decreasing a display magnification of an image displayed on the display section 52; a displayed position changing unit 89*b* for moving a displayed position of the image displayed on the display section 52; a simple imaging condition generating section 89*c* for generating a plurality of different provisional imaging conditions; an interlocking adjustment unit 89*d* for adjusting a display magnification and a displayed position of each simple image such that, when a magnification of one simple image is adjusted in the magnification adjusting unit 89*a* in the state of a plurality of simple images being list-displayed in a list display region, a magnification of another simple image is also adjusted as interlocked with this adjustment, and when a displayed position of one simple image is changed in the displayed position changing unit 89*b*, a displayed position of another simple image is also changed as interlocked with this change; and a display mode switching unit 89*e* for automatically switching display on the display section 52 from a second display mode to a first display mode. Further, the image processing unit functions as an image synthesizing unit 85 for synthesizing at least 2 observation images of the same observation target S captured by use of different illumination filters. This control section 51 can be configured of a gate array such as an ASIC or an FPGA.

The operation section 55 is connected with the body section 50 or the computer in a wired or wireless manner, or fixed to the computer. Examples of the general operation section 55 include a variety of pointing devices such as a mouse, a keyboard, a slide pad, TrackPoint, a tablet, a joystick, a console, a jog dial, a digitizer, a light pen, a numeric keypad, a touch pad, and ACCUPOINT. Further, each of these operation sections 55 can be used for operations of the magnifying observation apparatus 100 itself and its peripheral devices, in addition to an operation of a magnifying observation operating program. Moreover, input and an operation can be performed by the user directly touching the screen through use of a touch screen or a touch panel for a display itself for displaying an interface screen, video input or other existing input units can be used, or both of them can be used at the same time. In the example of FIG. 1, the operation section 55 is configured of a pointing device such as a mouse.

(Illumination Section 60)

The illumination section 60 generates illumination light for illuminating the observation target S whose image is formed in the imaging element 12. The illumination light source of the illumination section 60 is installed in the body section 50, and illumination light is transmitted to the illumination section 60 of the head section 4 via the optical cable 3b. The illumination section 60 can adopt either a configuration of a system incorporated into the head section 4 or a configuration of a detachable section separated from the head section 4. Further, as an illumination system for illumination light, epi-illumination, transmission illumination and the like can be used as appropriate. The epi-illumination is an illumination method of applying illumination light from a position above the observation target, and includes ring illumination, coaxial epi-illumination, and the like. The illumination section 60 shown in FIG. 1 is provided with a coaxial epi-illumination section 62 (cf. FIG. 3) for irradiating the observation target S with coaxial epi-illumination light; a ring illumination section 63 for performing irradiation with ring-like illumination light from a ring-like light source; and a transmission illumination section 64 for performing irradiation with transmitted light. Each illumination section is connected with the body section 50 via the optical cable 3b. The body section 50 is provided with a connector for connecting the optical cable 3b, and also installed with the illumination light source 65 for transmitting light to the optical cable 3b via the connecter (cf. FIG. 3). Further, the ring illumination section 63 can switch between all-around illumination and side illumination. In order to realize this, there can be used a configuration where a plurality of LEDs are arranged in a ring form as the ring illumination section 63 and part of the LEDs are turned on/off, a configuration where a turret type mask for cutting off part of illumination light is arranged, or some other configuration. Such lighting control and switching of the illumination light are performed in an illumination light control section 66. The illumination light control section 66 is provided with an illumination light switching section 61 for switching illumination light.

Figure 3:
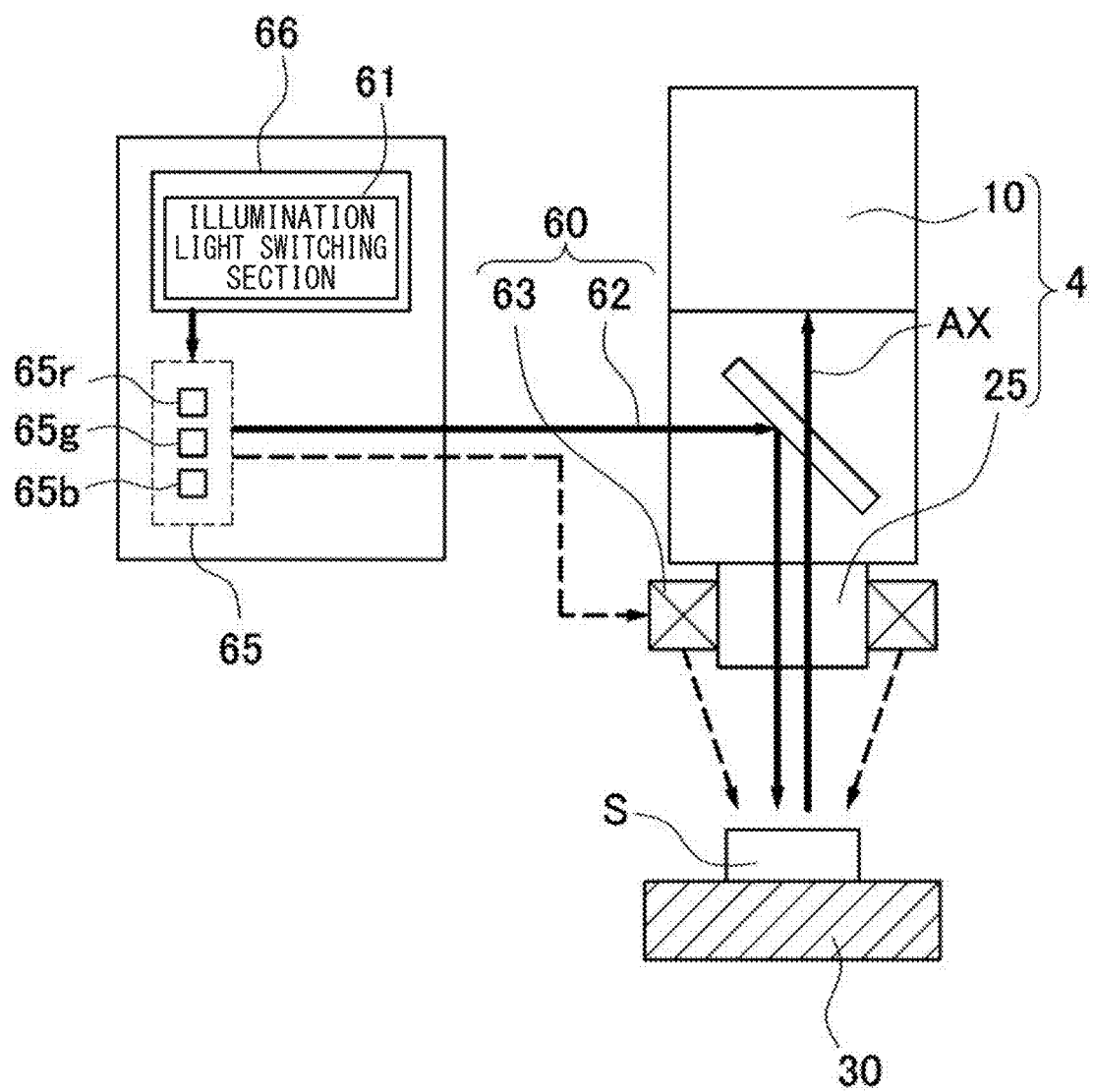
FIG. 3 is a schematic diagram showing an illumination section.

A schematic sectional view of FIG. 3 shows a detail of the illumination section 60. The illumination section 60 is provided with the coaxial epi-illumination section 62 and the ring illumination section 63. The coaxial epi-illumination is a method of performing irradiation from the same direction as an imaging surface of the camera, and is also called bright field illumination. The coaxial epi-illumination is effective especially in the case of, for example, viewing unevenness of a mirror surface workpiece such as a silicon wafer or an LCD panel. Lighting control for the illumination section 60 is performed in the illumination light control section 66. Further, the illumination light control section 66 is provided with the illumination light switching section 61, and the illumination light switching section 61 can switch between the coaxial epi-illumination section 62 and the ring illumination section 63. Further, the illumination light switching section 61 can also be configured so as to mix the coaxial epi-illumination section 62 and the ring illumination section 63 by changing a ratio therebetween.

(Magnified Image Observing Program)

Figure 4:
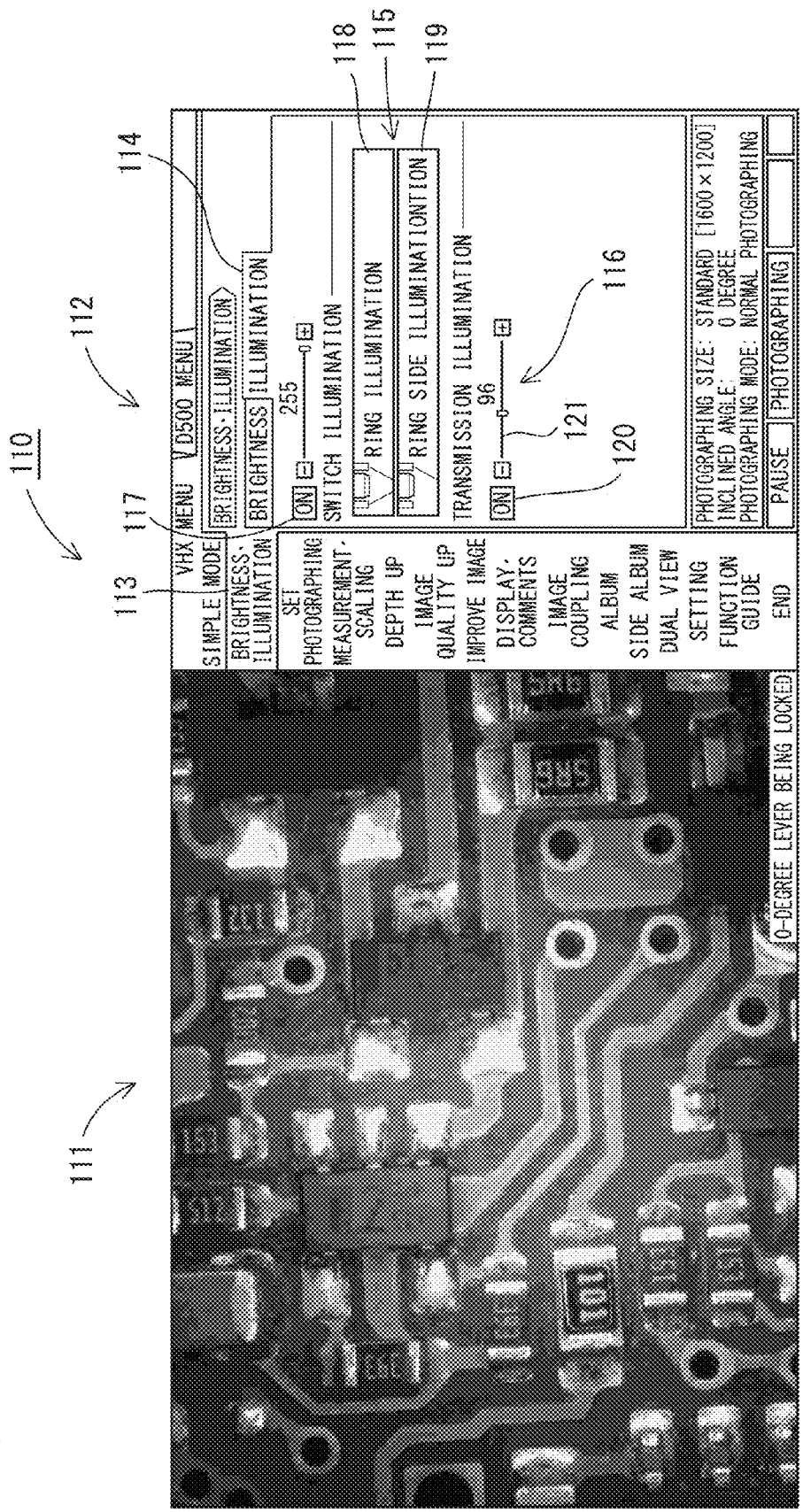
FIG. 4 is an image view showing a user interface screen of an illumination light switching screen of a magnified image observing program.

FIG. 4 shows one example of a user interface screen constituting one mode of the illumination light switching unit. FIG. 4 is a user interface screen of a magnified image observing program for operating the magnifying observation apparatus 100. Such an operation screen can be displayed on the display section 52 of the magnifying observation apparatus 100 or on a monitor of the externally connected computer. The user performs a variety of settings and operations of the magnifying observation apparatus 100 from the displayed screen. The magnified image observing program is incorporated in the body section 50.

Needless to say, in examples of the user interface screen of the program, it is possible to appropriately change arrangement, the shapes, a displaying manner, the size, the color, the pattern and the like of each input filed, each button or the like. A design change can make display easy for viewing, evaluation and determination, and make a layout easy for an operation. There can be made an appropriate change such as displaying a detailed setting screen in another window, or displaying a plurality of screens in the same display screen. Further, on each of the user interface screens of the program, designation to perform an on/off operation and input of a numeric value and an order on a virtually provided button and an input field is performed by means of the operation section 55. Here, an imaging condition and the like are set by means of an input device connected to the computer incorporated with the program. In the present specification, "pressing" includes clicking or selecting and artificially pressing a button by means of an input section, in addition to physically touching and operating the button. The input/output device constituting the operation section and the like is connected with the computer in a wired or wireless manner, or fixed to the computer or the like. Examples of the general input section include a variety of pointing devices such as a mouse, a keyboard, a slide pad, TrackPoint, a tablet, a joystick, a console, a jog dial, a digitizer, a light pen, a numeric keypad, a touch pad, and ACCUPOINT. Further, each of these input/output devices is not restricted to the operation of the program, but can also be used for an operation of hardware such as the magnifying observation apparatus 100. Moreover, input and an operation can be performed by the user directly touching the screen through use of a touch screen or a touch panel for the display of the display section 52 for displaying an interface screen, video input or another existing input unit can be used, or both of them can be used at the same time.

(Illumination Switching Screen 110)

The user interface screen of the magnified image observing program shown in FIG. 4 shows an illumination switching screen 110 as one mode of an illumination condition setting unit for setting an illumination condition of the illumination section. On the illumination switching screen 110, a display region 111 is provided on the left side, and an operation region 112 is provided on the right side. In the operation region 112, a menu is displayed in a ribbon form on the left side, and an operable content on the right side is switched in accordance with a selected ribbon. Further, a setting content can be switched here by switching a plurality of tabs. In the example of FIG. 4, a "brightness/illumination" ribbon 113 in the operation region 112 is selected, and an "illumination" tab 114 is further selected. Then the direction and brightness of each illumination light are set in an "epi-illumination" setting field 115 provided in an upper stage of the "illumination" tab 114 and a "transmission illumination" setting field 116 provided in its lower stage. For example, when an "On" button 117 in the "epi-illumination" setting field 115 is pressed, ring illumination is lighted, and its brightness is designated by 0 to 255. The brightness is designated by means of a numerical value or a slider. The image becomes bright when a light amount value is large, and the image becomes dark when the value is small. Further, a whole circumference of annular ring illumination is lighted when a "ring illumination" button 118 is pressed, and only part of the annular ring illumination is lighted when a "ring side illumination" button 119 is pressed. By obliquely performing irradiation with illumination light, for example, a flaw or unevenness on the surface of the observation target can be enhanced and observed.

Meanwhile, similarly in the "transmission illumination" setting field 116, when an "On" button 120 is pressed, transmission illumination is lighted, and its brightness is designated by means of a numerical value or a slider 121. In this example, ring illumination is turned on and transmission illumination is turned off. However, both illumination can be turned on and a balance therebetween can be adjusted in accordance with an observation purpose.

(Brightness Setting Screen 122)

Figure 5:
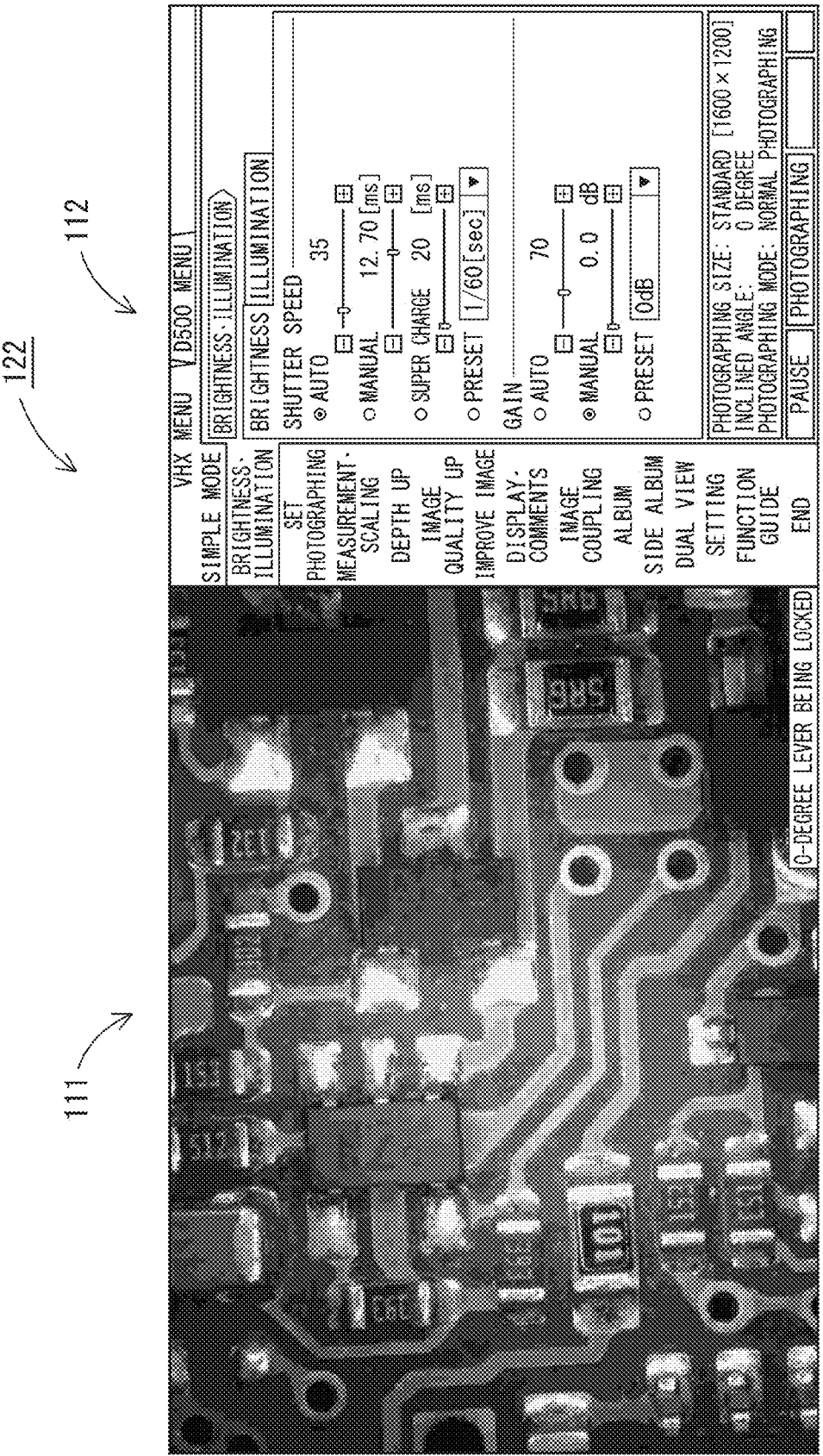
FIG. 5 is an image view showing a user interface screen of a brightness setting screen of the magnified image observing program.

Further, when the "illumination" tab 114 is selected in the operation region 112 in the illumination switching screen 110 of FIG. 4, the screen is switched to a brightness setting screen 122 of FIG. 5. On this screen, a shutter speed (exposure time) and a gain of the camera section at the time of imaging can be adjusted as brightness of the image. The image becomes bright when the shutter speed is made slow (the exposure time is made long), and the image becomes dark when the shutter speed is made fast (the exposure time is made short). Here, as the shutter speed, any of auto, manual, super charge and preset can be selected by means of a radio button. Further, the image becomes bright when the shutter gain value is made large, and the image becomes dark when the shutter gain value is made small. Here, as the gain, any of auto, manual and preset can be selected.

(Illumination Light Source 65)

As the illumination light source 65, there can be used a semiconductor light emitting element such as a light emitting diode (LED) or a laser diode (LD). For example, as shown in FIG. 3, LEDs 65r, 65g, 65b having wavelength regions of R, G and B are prepared, and illumination light can be switched to red, green or blue by lighting each LED, or white light can be obtained by mixing these colors. Further, a white LED can be separately prepared. Since the LED is especially excellent in on/off responsiveness, it is also possible to obtain an advantage of allowing improvement in throughput of measurement. Further, the LED is also provided with features of having a long lifetime, low power consumption, a low calorific value and resistance to a mechanical shock. Alternatively, the LED may be the light source using a wavelength converting member such as a fluorescent substance that is excited by ultraviolet rays or visible rays as light source light. Herewith, even one LED can emit white light. Further, an LED capable of performing irradiation with ultraviolet light or infrared light, in addition to visible light, can also be used as the light source. For example, observation by means of infrared light is useful in analysis of a defective product, tissue distribution of a biological tissue, and the like. It is to be noted that the illumination light source is not restricted to the semiconductor light emitting element, but a halogen lamp, a xenon lamp, an HID lamp or the like may be used as a white light source for emitting white light with a wide wavelength region. Further, the light source may be capable of performing irradiation with infrared light as well as visible light. The halogen lamp is particularly preferred since its light-emitting wavelength has a wide wavelength region. Moreover, not only a single light source is used, but a plurality of light sources can be provided. These can be simultaneously lighted and the mixed light can be used as illumination light, or these can be switched for illumination.

Figure 6:
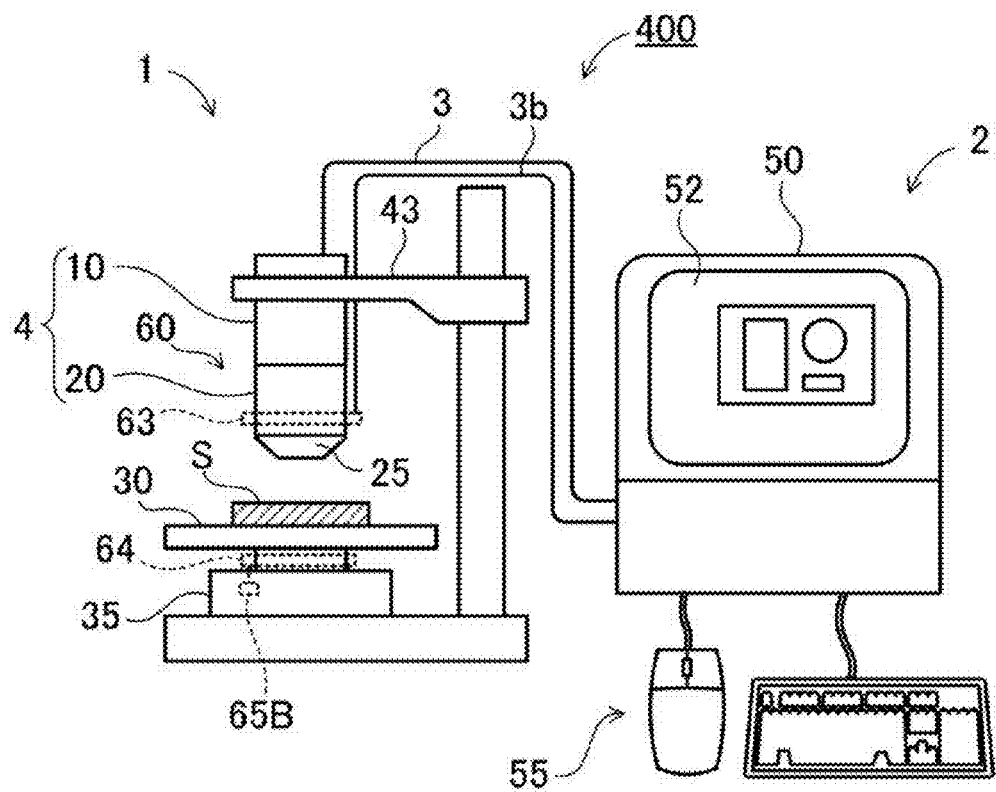
FIG. 6 is a schematic view showing a magnifying observation apparatus according to a modified example.
Figure 7:
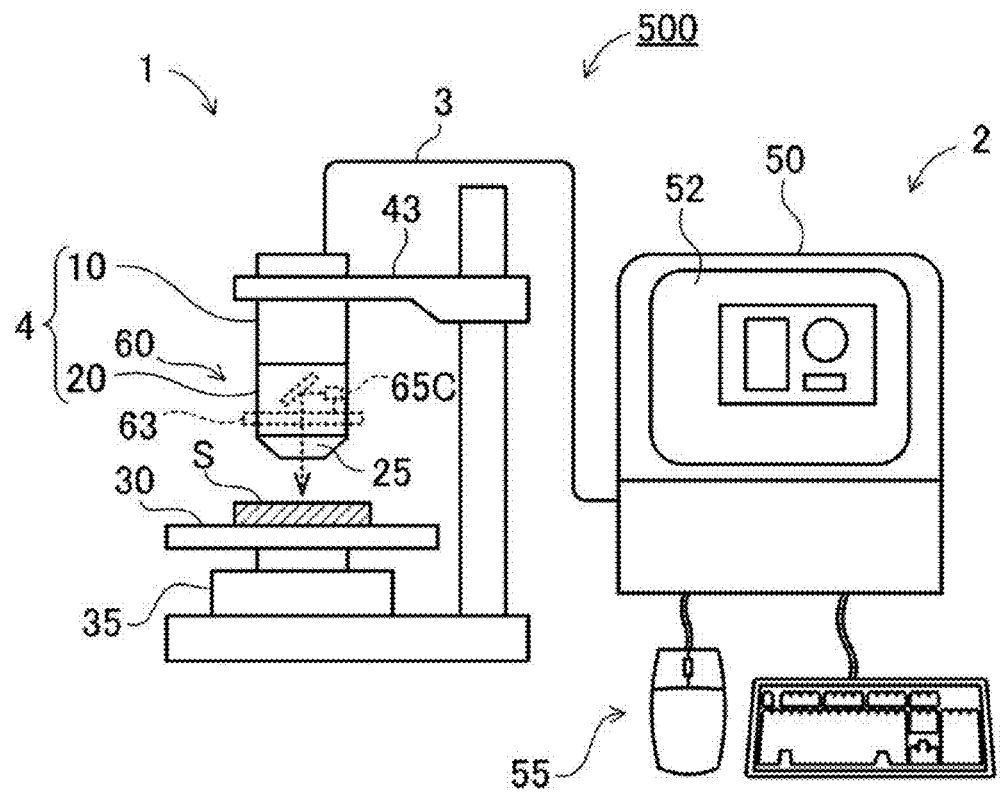
FIG. 7 is a schematic view showing a magnifying observation apparatus according to another modified example.

It is to be noted that the illumination light source is not restricted to the configuration of being installed in the body section. For example, it can be provided in the placement section or the microscope lens section. As a modified example, in a magnifying observation apparatus 400 shown in FIG. 6, a transmission illumination light source 65B is provided as the illumination light source on the placement section 30 side. Further, in a magnifying observation apparatus 500 shown in FIG. 7, an illumination light source 65C for the coaxial epi-illumination and the ring illumination is provided on the microscope lens section 20 side. With such configurations, it is possible to obtain an advantage of eliminating the need for transmitting illumination light from the body section side to the head section side by means of an optical fiber or the like, and reducing the number of cables to be extracted to the outside, so as to simplify the configuration. Further, also inside the head section side, light from the illumination light source may be divided by an optical fiber, or a semiconductor light emitting element such as an LED with high brightness can be provided for direct illumination. In particular, as compared to a conventional halogen lamp and the like, the LED has a small size, a low calorific value, and a long lifetime, and can be made maintenance-free.

As thus described, by preparing the illumination light source capable of emitting red, green and blue light, it is possible to eliminate the need for a filter as in the conventional white light source, and also eliminate the need for performing a mechanical operation such as switching of the filter, so as to perform stable and high-speed switching of illumination light only by means of an electrical signal. Further, with the LED having a long lifetime, it is possible to save time and labor for a maintenance operation such as replacement of an electric bulb. Moreover, since the semiconductor light emitting element has a small size as compared to the bulb, there is an advantage that a plurality of kinds of light emitting elements can be arranged in a space saving manner. Furthermore, for example by also providing an infrared light emitting element or an ultraviolet light emitting element, it is possible to easily switch illumination light not only to visible light but also to infrared light, ultraviolet light, or the like. Additionally, the semiconductor light emitting element has low consumption power, and its cooling fan can be reduced in size or omitted, to realize excellent quietness. In such a manner, it is possible to control the illumination light source provided with a plurality of light emitting elements with different wavelength regions by the illumination light selecting unit 87, select and light a light emitting element with a desired wavelength region, and perform irradiation with illumination light.

Further, in addition to the 3 primary colors of RGB, complementary colors (e.g., cyan, magenta, yellow) of these can be used as appropriate for the illumination light source and the illumination filtering unit. Moreover, a filter for allowing transmission of ultraviolet light or infrared light can also be used as the filter.

(Coaxial Epi-Illumination Observation)

Figure 8:
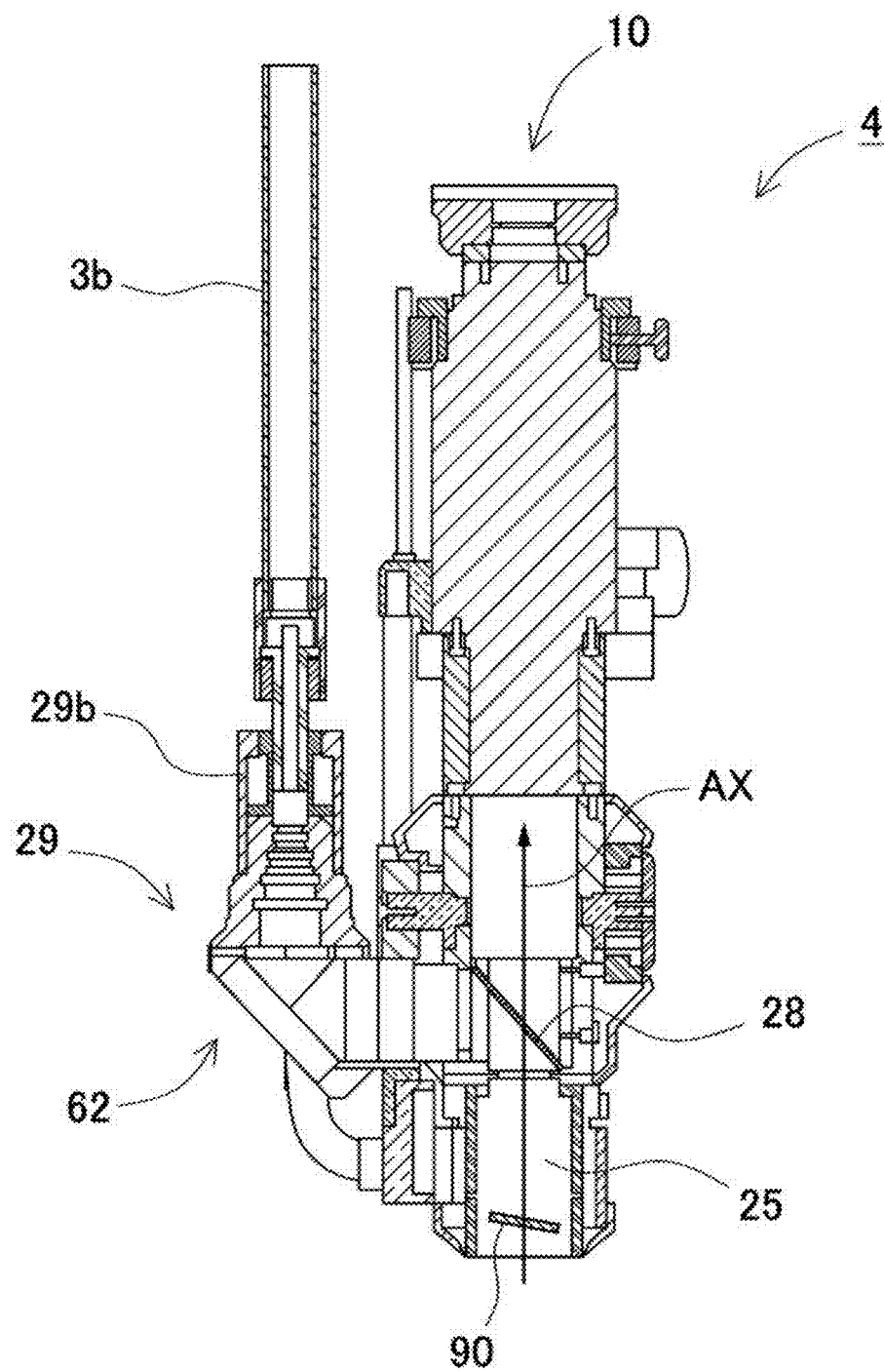
FIG. 8 is a sectional view of a head section.

FIG. 8 shows a sectional view of the head section 4. This head section 4 is provided with: the coaxial epi-illumination section 62 for irradiating the observation target with coaxial epi-illumination light; the camera section 10 having an imaging element for receiving reflected light of illumination light applied by the coaxial epi-illumination section 62; the objective lens section 25 which is optically bonded with the camera section 10 by matching optical axes thereof; and a phase delaying element 90 arranged by matching its optical axis with the optical axis of the objective lens section 25. The illumination section 60 includes the coaxial epi-illumination section 62 and the ring illumination section 63. The head section 4 is provided with the camera section 10, a polarized beam splitter 28, and the objective lens section 25. These are optically bonded in a state where optical axes AX thereof are matched, and constitute the imaging optical system. Further, the phase delaying element 90 is arranged on the optical axis AX in the objective lens section 25. Meanwhile, the ring illumination light is not introduced into the imaging optical system, and the observation target S is directly irradiated with the ring illumination light. It is to be noted that for the phase delaying element 90, a λ/4 plate, a λ plate, a (½))λ plate, a (¾)λ plate, a (⅝)λ plate or the like can be used, and the λ/4 plate is typically used. In addition, the λ/4 plate is preferably arranged as inclined with respect to the optical axis AX so as to prevent occurrence of reflection on its boundary surface.

(Support Base 40)

Figure 9:
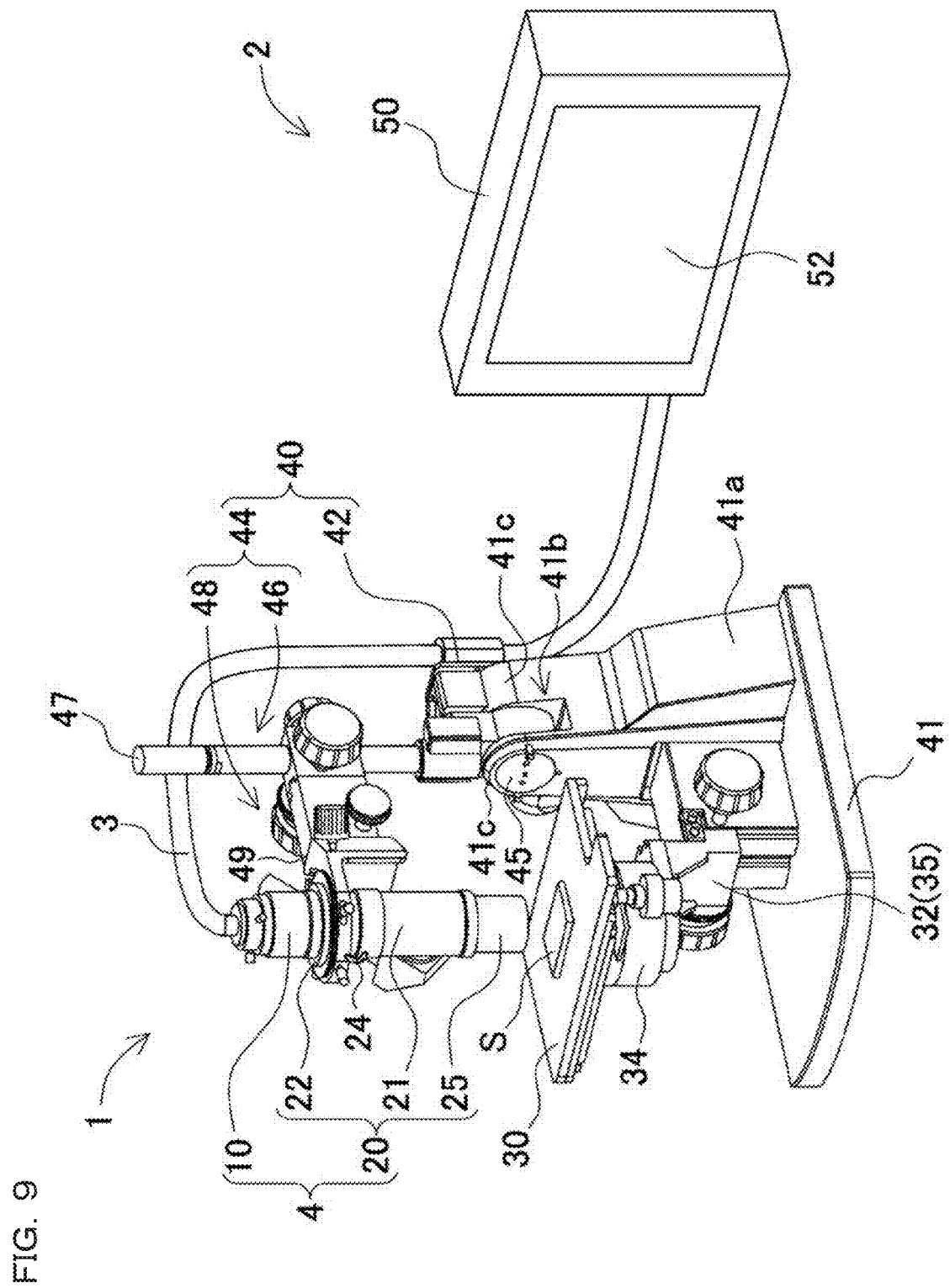
FIG. 9 is a perspective view showing an appearance configuration of an imaging system of the magnifying observation apparatus.

FIG. 9 shows one example of the appearance configuration of the imaging system 1 in the magnifying observation apparatus 100. The imaging system 1 shown in FIG. 9 is provided with the placement section 30 for placing the observation target S, and a support base 40 for supporting the head section 4. The support base 40 is provided with a stage fixing mechanism 42 for holding the placement section 30 so as to movable in the horizontal plane or vertically, and a head inclining mechanism 44 for inclining the head section 4 in the state of holding the placement section 30. The stage fixing mechanism 42 and the head inclining mechanism 44 are fixed to a base section 41. The base section 41 is formed in a tabular shape and stably makes the support base 40 independent.

(Stage Fixing Mechanism 42)

The stage fixing mechanism 42 fixes the placement section 30 to the support base 40 via one or more movement mechanisms capable of moving the placement section 30 in the horizontal plane (xy-axis direction) and in the vertical direction (z-axis direction). Specifically, it is possible here to use, as the movement mechanism, a z-axis direction movement mechanism (first focus adjusting section) for moving the placement section 30 in the z-axis direction, an xy-axis direction movement mechanism for moving the placement section 30 in the xy-axis direction, and a rotational movement mechanism for rotating the placement section 30 in a θ-direction. In the example shown in FIG. 9, as the z-axis movement mechanism, the lower stage lift 35 is realized by a slider 32 fixed onto the base section 41 in a vertically movable manner. Further, as the rotational movement mechanism, the placement section 30 is made rotatable by an intermediate coupling section 34 fixed onto the slider 32. Additionally, as the xy-axis movement mechanism, the placement section 30 is made movable in the xy-axis direction by the x-y stage fixed onto the intermediate coupling section 34. The xy-axis movement mechanism, the z-axis movement mechanism and the rotational movement mechanism function as visual field moving units for changing a visual field of an image displayed on the display section 52.

(Head Inclining Mechanism 44)

Figure 10:
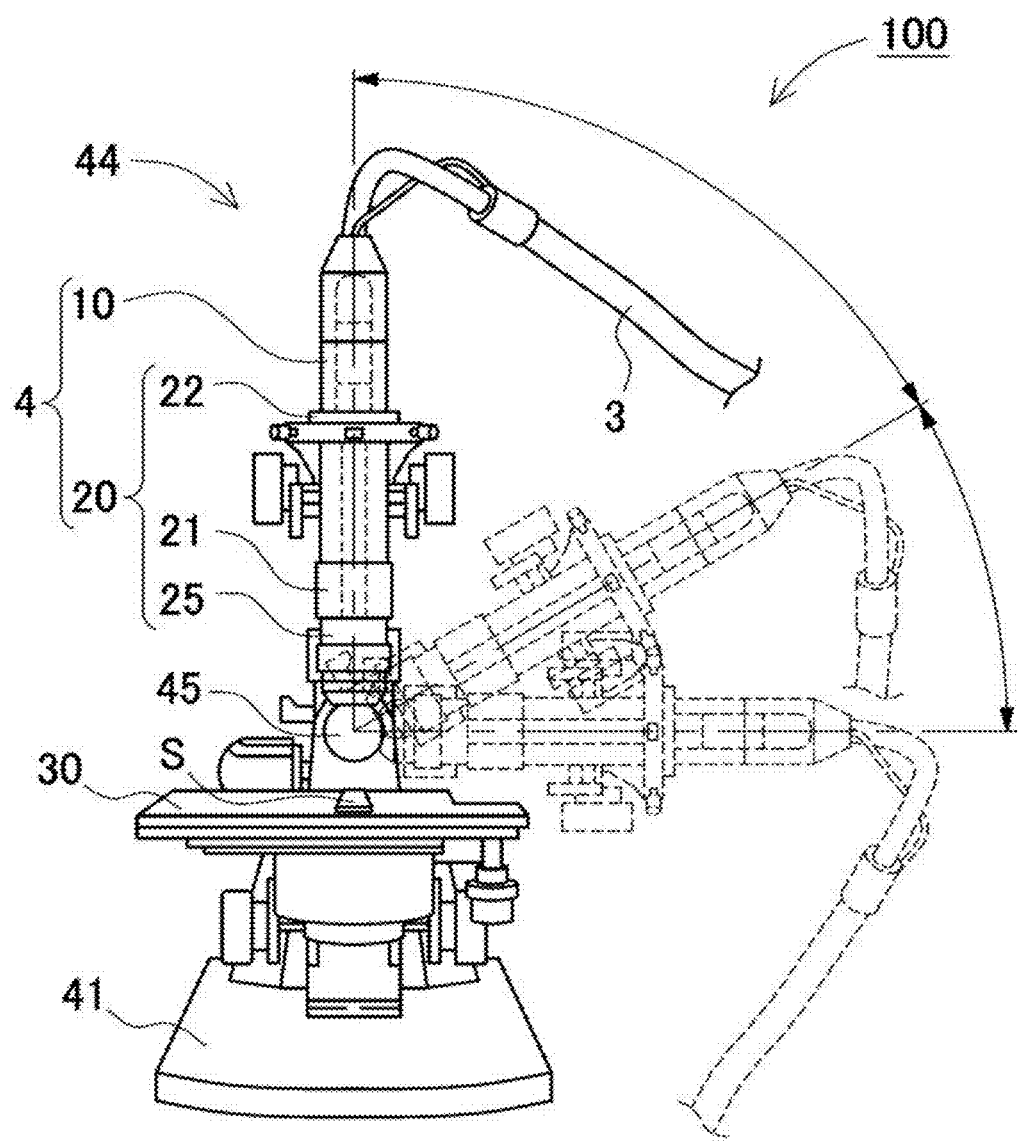
FIG. 10 is a schematic view showing the situation of swinging the head section.

In the meantime, for inclining the head section 4 with respect to the placement section 30, the head inclining mechanism 44 is provided with a swinging section 46 coupled swingably to the base section 41 via a swinging axis 45, and a head fixing section 48 for fixing the head section 4 to the swinging section 46, as shown in a perspective view of FIG. 10. The swinging section 46 is provided with the swinging axis 45, and a swaying support 47 provided in the attitude of protruding upward from the base section 41. Further, the head fixing section 48 is provided with a head arm 49 for fixing the head section 4 to the swaying support 47 in an almost parallel attitude. The swaying support 47 is provided with the swinging axis 45 at its lower end, and supported by the base section 41 so as to be circulated around the swinging axis 45. Further, the head arm 49 is fixed by, for example, cramping the swaying support 47 in a position from an upper portion to a middle portion of the swaying support 47 so as to hold the head section 4 above the placement section 30. Moreover, a fixing mechanism for fixing the head section 4 is provided at the tip of the head arm 49. Here, the fixing mechanism is formed in a ring shape surrounding an outer circumference of the head section 4, and the head section 4 is inserted into the center of the ring shape, and screwed at a plurality of positions therearound for fixing.

A block 41a that is widened downward is fixed to the upper surface of the base section 41, and a bearing 41b is formed in an upper portion of the block 41a. The bearing 41b is provided with a pair of guide sections 41c that are fixed as separated from each other, and the pair of guide sections 41c are formed in a recessed shape in a side surface view. The respective guide sections 41c have circular holes formed with a parallel axis to the y-axis direction taken as a central axis. The swinging axis 45 is fitted to these holes along the y-axis direction. In this example, it is configured that the swinging axis 45 is provided with a scale and an angle at which the head section 4 is swayed can be visually viewed by means of the scale.

The head section 4 is inclined with respect to the placement section 30 by the head inclining mechanism 44, thereby allowing inclined observation in which the observation target S is observed from an oblique direction. Especially by horizontally swaying the head section 4 from a vertical attitude with the swinging axis 45 taken as a rotational axis, observation can be performed from either a left direction or a right direction, and the observation from different viewpoints allows improvement in flexibility of observation. Further, in such inclined observation, eucentric observation is required where the visual field is not changed even when the head section 4 is inclined. For this reason, at the time of the inclined observation, the height of the placement section 30 is desirably adjusted such that the observation surface of the observation target S is previously matched to the center of the swinging axis 45.

Figure 11:
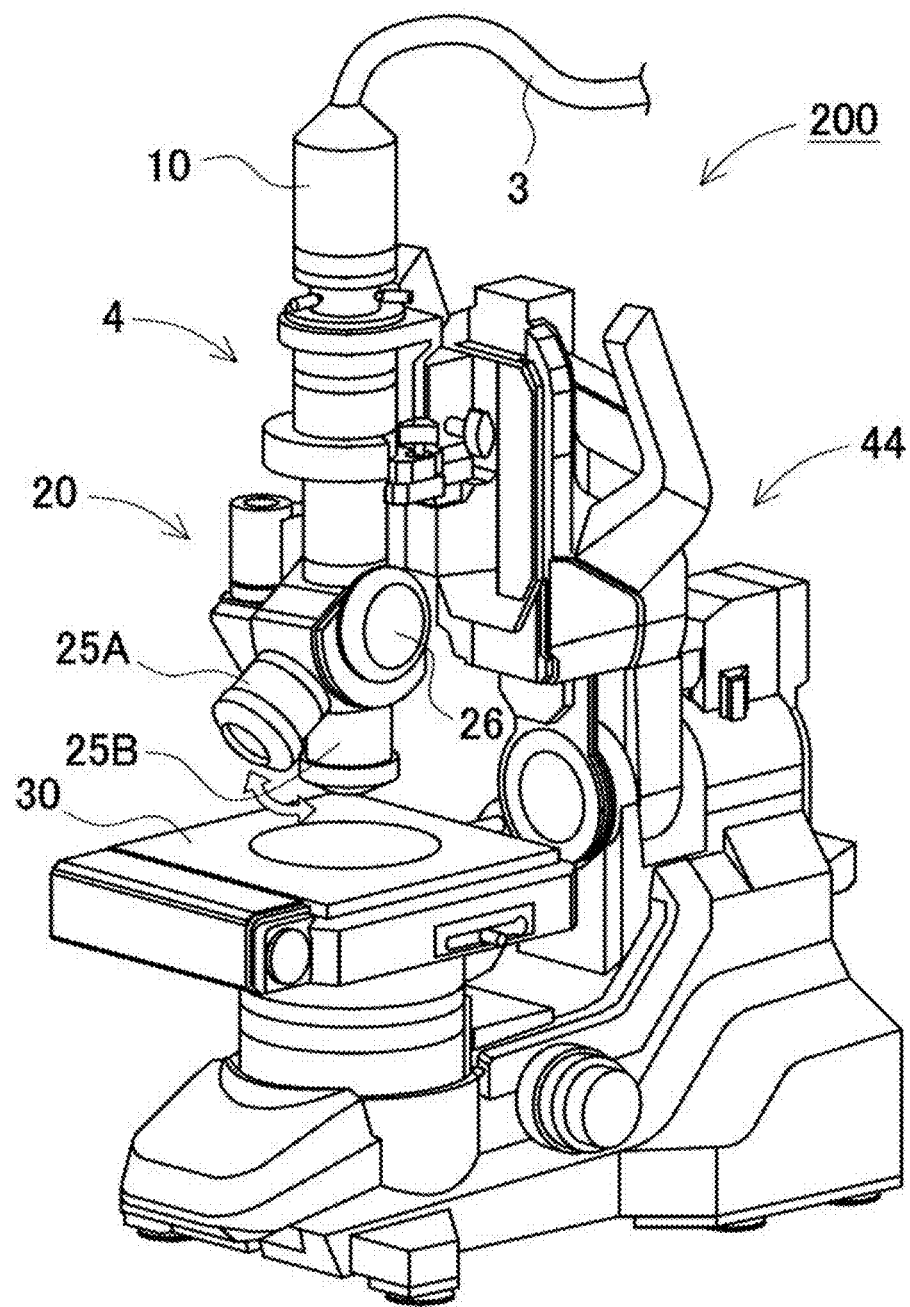
FIG. 11 is a perspective view showing the magnifying observation apparatus provided with an objective lens switching unit.

Further, as shown in a perspective view of FIG. 11, a magnifying observation apparatus 200 is provided with an objective lens switching unit 26 for swaying a first objective lens section 25A and a second objective lens section 25B, which are provided at the tip of the head section 4 in a vertical plane to a plane where the head section 4 is swayed, to perform switching. As thus described, the swaying plane of the head section 4 and the swaying plane for switching the objective lens section 25 are made orthogonal to each other, thereby allowing avoidance of a situation where the tip of the objective lens comes into contact with the observation target at the time of switching the objective lens section 25 in the state of the head section 4 being inclined. Here, each objective lens section is previously designed so as to have the same length.

(Camera Section 10)

The head section 4 is provided with the camera section 10 having the imaging element, and the microscope lens section 20 detachably mounted at the tip of the camera section 10. The camera section 10 is provided with the imaging element 12 for electrically reading reflected light incident via the imaging optical system 11 from the observation target S illuminated by the illumination section 60. A CMOS is used as the imaging element 12 in this example, but another light reception element such as a CCD can also be used. Further, in addition to the objective lens section 25, the microscope lens section 20 is provided with a lens body 21, and a mount section 22 mounted on the end surface of this lens body 21 to constitute a lens contact surface. Moreover, the mount section 22 is electrically connected with the microscope lens section 20 via a lens-side cable 24 having flexibility. Herewith, lens identification information of the microscope lens section 20 is transmitted to a lens-side connection terminal of the mount section 22 via the lens-side cable 24.

(Optical Path Shifting Unit 14)

Further, the magnifying observation apparatus 100 can also be provided with the optical path shifting unit 14 for relatively shifting a detection position of the imaging element 12, and the optical path shifting controlling unit 81 for activating the optical path shifting unit 14. Specifically, concerning 3 or more marked pixel groups, a detection position of any of imaging elements constituting the marked pixel group is relatively shifted by the optical path shifting unit 14 by a movement amount corresponding to an interval between pixels of the imaging element such that a light receiving signal makes a round through positions of the pixels of imaging elements constituting the marked pixel group and a light reception amount is detected at each position.

(Optical Path Shifting Controlling Unit 81)

The optical path shifting controlling unit 81 activates the optical path shifting unit 14 such that at the time of irradiating the specimen S with illumination light with a predetermined wavelength via an illumination filter selected with a filter selecting unit 88, a light reception amount is detected in an imaging element corresponding to the wavelength region out of a plurality of imaging elements. This can make selection of the illumination filter and the imaging element interlocked with pixel shifting, whereby it is possible for the user to easily acquire a high-resolution observation image without being conscious of troublesome switching and combination of selection of illumination light and selection of the illumination filter and the imaging element in accordance with the illumination light.

In the example of FIG. 2, the optical path shifting unit 14 is provided in the camera section 10, and by pixel shifting, it is possible to obtain a higher resolution than a resolution of the CMOS. Pixel shifting is to achieve a high resolution in such a manner that, for example by using a piezo-electric element or the like for a single plate type or a three-plate type, an image, which is photographed as the specimen S is shifted, for example, by a half of a pixel pitch by pixel shifting for physically shifting the element to a space between adjacent elements (pixels), is synthesized with an image before the shifting. Further, by performing shifting by 1 pixel pitch and acquiring RGB data at each pixel, color reproduction properties can also be improved. As typical mechanisms for pixel shifting, there are an imaging element driving system for moving the imaging element 12 by means of an actuator AC or the like, an LPF inclining system for inclining an LPF, a lens moving system for moving the lens, and the like.

When the pixel shifting function is executed, as shown in FIG. 12, in a state where the imaging elements are arranged at corresponding pixels in a matrix form in a Bayer array, the optical path shifting unit 14 can perform switching so as to shift the imaging elements to 2×2 adjacent pixel positions, as shown in FIG. 13. Herewith, the Bayer-arrayed imaging elements with different light receiving characteristics are shifted by the optical path shifting unit 14 so as to make a round with respect to the adjacent 2×2 marked pixels, whereby it is possible to acquire a light receiving signal at each of all the 2×2 pixel positions and obtain a high-resolution observation image. It is to be noted that a shift amount of the imaging element being relatively shifted by the optical path shifting unit 14 is 4 times of counterclockwise shifts corresponding to a total of 4 pixels as a displacement amount of the imaging element which corresponds to the pixel interval in the example of FIG. 13. However, it can also be shifted only by 2 adjacent pixels vertically, horizontally or the like, or only by 3 pixels. Further, the movement amount is not restricted to an amount corresponding to 1 pixel of the imaging element, but it can also be an amount corresponding to one-half of the pixel as shown in FIG. 14, an amount corresponding to one-third of the pixel, or the like. By adjusting the movement amount in accordance with a peak position and a range of light-receiving sensitivity at each pixel constituting the imaging element, it is possible to improve the light reception amount even by a movement amount not larger than the amount corresponding to 1 pixel, so as to achieve a high resolution. As thus described, the displacement amount corresponding to the pixel interval of the imaging element is not restricted to the amount that is equivalent to the pixel pitch or an integral multiple thereof, but also includes the amount that is a fraction multiple thereof such as one-half of the pixel or one-third of the pixel.

(Display Section 52)

Further, such image data and the setting content stored in the storage section 53 can be displayed on the display section 52. As the display section 52, a CRT display, a liquid crystal display, an organic EL monitor or the like can be used. Further, the operation section 55 for the user performing a variety of operations is connected to the control section 51. The operation section 55 is an input device such as a console or a mouse. It should be noted that also in this example, the display section and the operation section can be incorporated integrally with the body section 50, or can be external members. Moreover, when the display section is configured by a touch panel, the display section and the operation section can be integrally configured.

Here, an operation of the lower stage lift 35 will be described. By input of control data concerning control of a stepping motor 37 into a motor control circuit 36, the body section 50 changes a relative distance in the optical axis direction between the placement section 30 and the head section 4 having the imaging optical system 11 and the imaging element 12, which is the height in the z-direction in this case. Specifically, by input of control data necessary for controlling the lower stage lift 35 into the motor control circuit 36, the body section 50 controls rotation of the stepping motor 37 and increases or decreases a height z (a position in the z-direction) of the placement section 30. The stepping motor 37 generates a rotation signal in accordance with rotation. Based on the rotation signal inputted via the motor control circuit 36, the body section 50 stores the height z of the placement section 30 as information concerning the relative distance between the placement section 30 and the imaging optical system 11 in the optical axis direction. This placement section 30 functions as an observation positioning unit for performing positioning of an observation position on the observation target S.

Needless to say, the lower stage lift 35 is not restricted to an electrically lifting type, but can be configured as a manually lifting type.

Further, in the present embodiment, not only the relative distance between the placement section 30 and the imaging optical system 11 in the optical axis direction is changed by changing the height of the placement section 30, but the height of the imaging optical system 11, namely the height of the head section 4, can also be changed. The head section 4 is connected with the body section 50 by the cable section 3. Herewith, data acquired in the head section 4 is transmitted to the body section 50 via the cable section 3, and necessary processing can be performed on the body section 50 side. The placement section can be provided in a head section as a separate member from the body in addition to being provided in the microscope body, or the imaging section with the stage omitted therefrom can be provided in the head section. The imaging section with the stage omitted therefrom can also be mounted on an attachment stand, or held by the user.

The imaging element 12 can electrically read a light reception amount at each of pixels that are two-dimensionally arranged in the x-direction and the y-direction. An image of the observation target S formed on the imaging element 12 is converted to an electric signal in accordance with the light reception amount at each pixel of the imaging element 12, and is converted further to digital data in an imaging element control circuit 13. The body section 50 stores into the storage section 53 the digital data converted in the imaging element control circuit 13 as light reception data D, along with pixel arrangement information (x, y) as two-dimensional position information of the observation target S in a plane (the x/y-directions in FIG. 2) almost vertical to the optical axis direction (the z-direction in FIG. 2). Here, "in a plane almost vertical to the optical axis direction" need not be a plane strictly forming 90° against the optical axis direction, but may only be an observation plane within a range of inclination to such an extent that the shape of the observation target S can be recognized at resolutions in the imaging optical system and the imaging element.

Further, although the example of the observation target S being placed on the placement section 30 has been shown as one example of the placement section 30 in the above description, for example, it can also be configured that an arm is attached in place of the placement section and the observation target S is fixed to its tip. In addition to being mounted for use on a camera attaching section 43, the head section 4 can further be arranged at a desired position and angle by a method where it is made detachable and is held with a hand, or some other method.

(Control Section 51)

The control section 51 performs control so as to convert the captured observation image to an image with a resolution at which it can be displayed on the display section 52 and display the obtained image. In the magnifying observation apparatus 100 of FIG. 1, an observation image, obtained by the camera section 10 capturing an image of the observation target S by means of the imaging element 12, is displayed on the display section 52. Generally, performance of the imaging element such as a CMOS or a CCD often exceeds a display capability on the display section, and hence in order to display the captured observation image on one screen, a resolution is reduced to a size in which the image can be displayed on one screen by thinning out pixels, or the like, to reduce and display the image. When a reading resolution at the time of reading in the camera section 10 is taken as a first resolution, display is performed on the display section 52 at a second resolution that is lower than the first resolution.

(Simple Imaging Condition Generating Function)

Figure 15:
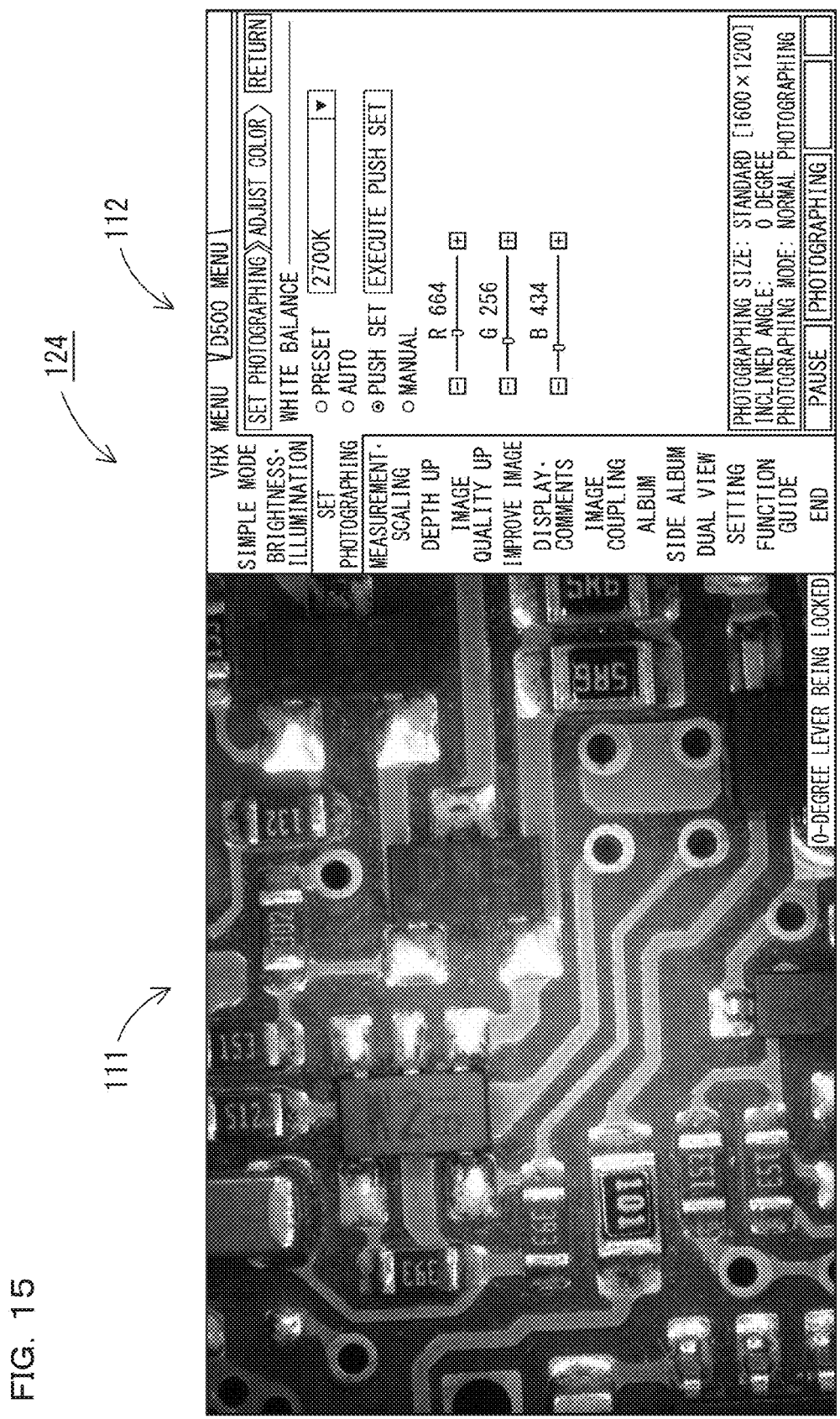
FIG. 15 is an image view showing a user interface screen of a white balance setting screen of the magnified image observing program.
Figure 16:
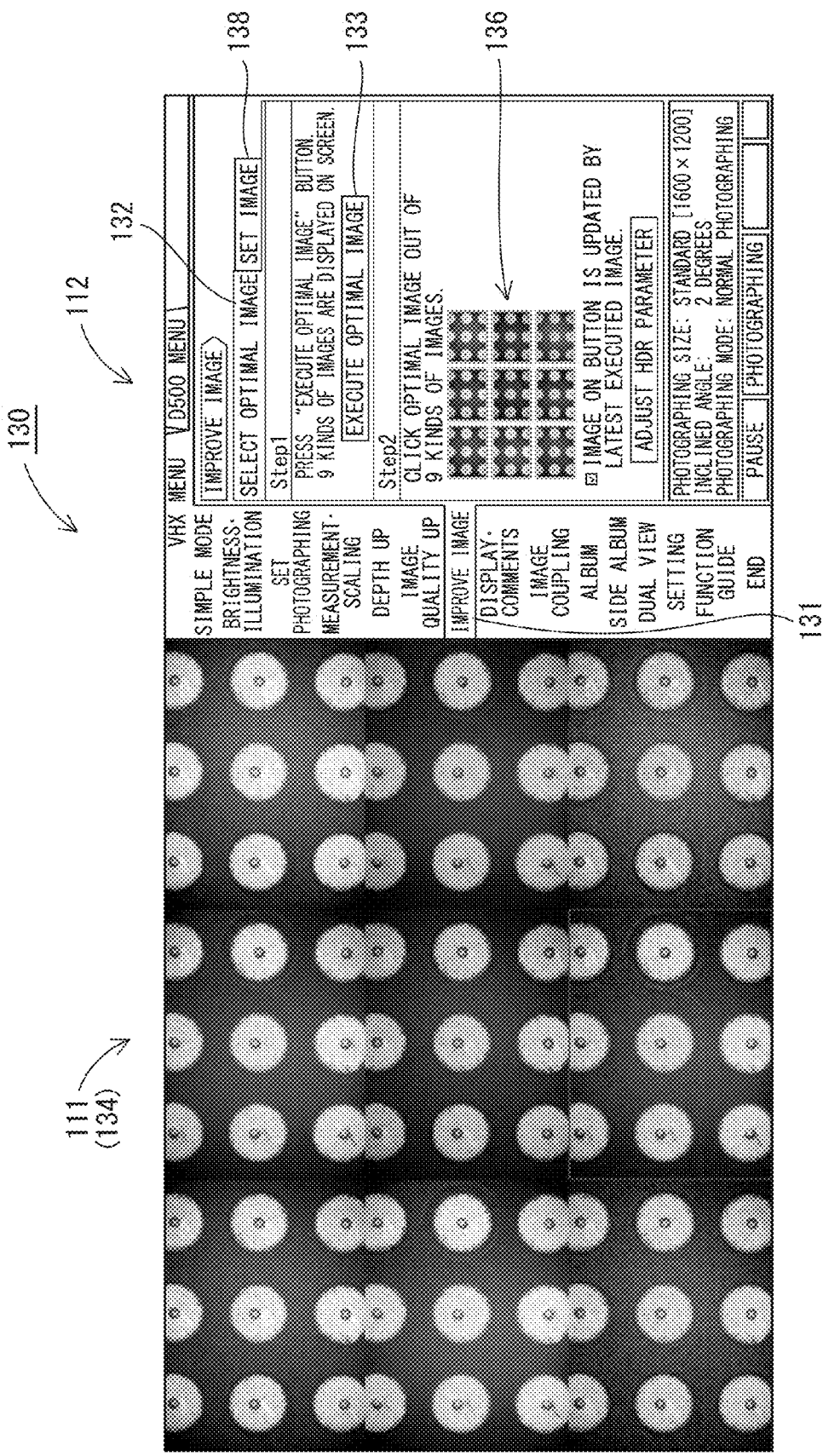
FIG. 16 is an image view showing a user interface screen of the magnified image observing program where a list display region is displayed.
Figure 17:
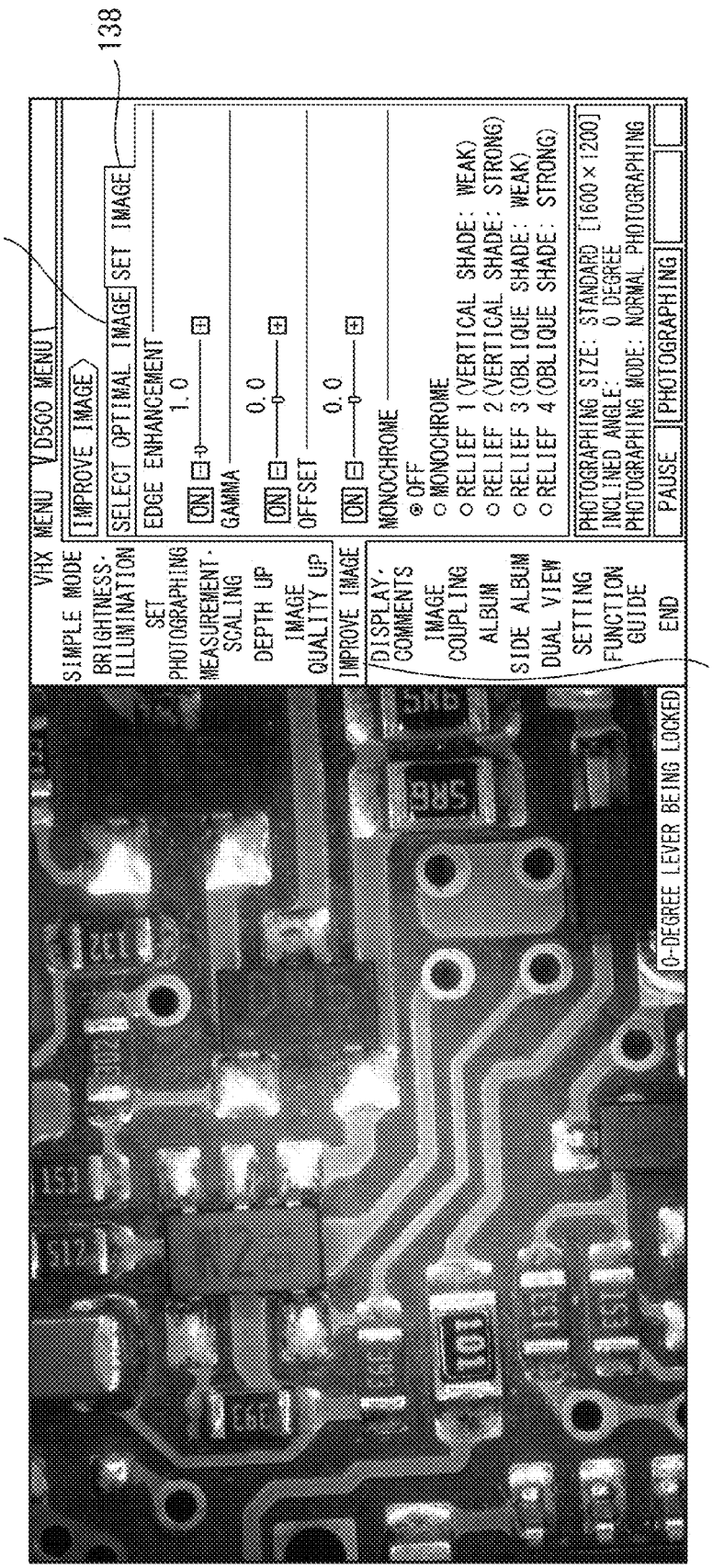
FIG. 17 is an image view showing a user interface screen of an image setting screen of the magnified image observing program.

At the time of observing the observation target by use of the magnifying observation apparatus 100, it is of necessity to set an imaging condition for acquiring an image. Examples of the imaging condition include a variety of imaging parameters such as selection of illumination light in the case of a plurality of illumination sections 4 being provided, the kind and the direction of illumination light, a shutter speed (exposure time) of the camera section, brightness and contrast of a screen, a white balance and the type of image processing such as a variety of filtering as post-processing after imaging (here, parameters including the post-processing parameters after imaging are referred to as "imaging parameters"). Further, the imaging conditions include an illumination condition for setting illumination light. As one example, a user interface screen of the magnified image observing program is shown in each of FIGS. 4 and 15 to 17 as one mode of the imaging condition setting section 83 for setting such an imaging condition. In these figures, as described above, FIG. 4 shows the illumination switching screen 110 as one mode of the illumination condition setting unit for setting the illumination condition of the illumination section 4. Further, FIG. 15 shows an example of a white balance setting screen 124 for setting a white balance, FIG. 16 shows an example of a list display region, and FIG. 17 shows an example of an image setting screen. On the white balance setting screen 124 of FIG. 15, a white balance, namely a color shade of an image, can be adjusted. In the list display region of FIG. 16, by selecting a desired simple image out of simple images each captured on a simple imaging condition having been simply set, the simple imaging condition set for this simple image can be set as an imaging condition. On the image setting screen of FIG. 17, a variety of imaging conditions are set. In such a manner, when the imaging condition is set and changed in the imaging condition setting section 83, a later-described display mode switching unit 89e determines that an image changing operation has been performed and switches the display mode.

(Simple Imaging Condition Setting Function)

It is troublesome to individually set such imaging conditions. Further, since some imaging parameters are correlated to each other, it may be difficult especially for a beginner user to find out which parameter needs to be adjusted in order to obtain a desired image. Therefore, the magnifying observation apparatus according to the present embodiment is provided with a simple imaging condition setting function of previously generating in a simple manner a plurality of temporary imaging conditions obtained by combining a variety of imaging parameters, and further list-displaying on the display section a simple image acquired on each simple imaging condition. Accordingly, by allowing the user to select a desired simple image out of the list-displayed simple images, the simple imaging condition, on which this simple image has been acquired, can be set as a normal imaging condition, and hence even a user not familiar with the operation can easily obtain an image visually close to a desired image. Further, each imaging parameter can be finely adjusted with respect to the selected simple imaging condition, and there can thus be obtained an advantage of being able to easily perform an imaging condition setting operation. Such a simple imaging condition generating function can be realized by the simple imaging condition generating section 89c of the control section 51.

A plurality of different simple imaging conditions generated in the simple imaging condition generating section 89c are set in the illumination section 4 and the camera section 10 from the control section, and each simple image is simply captured. Since the simple image captured here is just intended on being list-displayed for the user to make comparisons, a fine image need not be acquired, and simple imaging is sufficient for the purpose. Specifically, an image is obtained in a shorter period of time than the time taken in normal imaging by reducing a resolution or a frame rate, by simplifying computational processing for image generation or by some other means. Herewith, a plurality of simple images on different simple imaging conditions can be acquired in a short period of time (this may be referred to as a preview in the meaning of being preliminary imaging). The simple imaging condition generating section 89c can make an impression of the obtained simple image significant by setting to an imaging parameter that can largely change a visual effect.

(List Display Function)

Further, the magnifying observation apparatus 100 is provided with a list display function for list-displaying simple images, simply acquired on a plurality of different simple imaging conditions generated in the simple imaging condition generating section 89c, in the list display region on the display section. An example of the list display is shown on a list display screen 130 of FIG. 16. In the example of FIG. 16, for executing the list display function, an "improve image" ribbon 131 in the operation region 112 is selected, and a "select optimal image" tab 132 is selected. Then, an "execute optimal image" button 133 provided in an upper stage of the "select optimal image" tab 132 is pressed, to switch the display region 111 to a list display region 134. In the list display region 134, the simple images captured on the respective simple imaging conditions are arrayed and displayed. In this example, 9 simple imaging conditions are generated by the simple imaging condition generating section 89c, and 9 simple images simply captured on the respective imaging conditions are displayed. The respective simple images are subjected to different image processing and illumination effects, and out of these, the user selects a desired simple image in accordance with an observation purpose. In the example of FIG. 16, 9 list-displayed images 136 similar to those in the list display region 134 are also displayed in the operation region 112. Since an array of the list-displayed image 136 matches an array of the list display region 134, the user decides a desired simple image while comparing each simple image in the larger list display region 134, and selects the image present in the corresponding position out of the list-displayed images 136 in the operation region 112 by a mouse click or the like. Herewith, a simple imaging condition corresponding to the selected simple image is called and this simple imaging condition is inputted as a normal imaging condition. Further, the user can finely adjust the imaging condition as needed.

In the example of FIG. 16, when a "set image" tab 138 is selected, the screen is switched from the list display screen 130 to an image setting screen 140 of FIG. 17. Here, it is possible to finely adjust edge enhancement, gamma correction, offsetting and monochrome setting as the imaging parameters. In this example, the edge enhancement, the gamma correction and the offsetting are adjusted using a slider, and in the monochrome setting, a degree of enhancing a shade is selected using a radio button. Here, the edge enhancement is an imaging parameter for enhancing an edge portion of the image to facilitate observation of a flaw or a fine matter, and the larger its value, the more strongly the edge enhancement is applied. Further, the gamma correction is adjustment performed on a brightness histogram of each pixel included in the image, and used for enhancement of contrast or gradation. Moreover, the offsetting adjustment is also adjustment of a brightness histogram, and used at the time of making the whole image brighter or darker. Furthermore, it is also possible to generate a new simple imaging condition in accordance with the setting condition here, and again execute the list display function. Additionally, by pressing an "adjust HDR parameter" button provided below the list-displayed image 136, the screen is shifted from the screen of FIG. 16 to a detailed synthesis parameter setting screen for generating an HDR image.

(Image Synthesizing Unit 85)

Further, as a synthetic image photographing mode for acquiring a synthetic image in a synthetic image generating unit 85, the magnifying observation apparatus is provided with a dynamic range extension photographing mode suitable for an application of extending a dynamic range, and a resolution improvement photographing mode for improving a brightness resolution and enhancing a contrast. In the dynamic range extension photographing mode, there is generated a synthetic image having a wider dynamic range than that of an original image. On the other hand, in the resolution improvement photographing mode, there is generated a synthetic image having a brightness resolution more improved than that of the original image in a narrower dynamic range than a dynamic range of the imaging element.

(HDR Image)

Figures 18A, 18B, 18C:
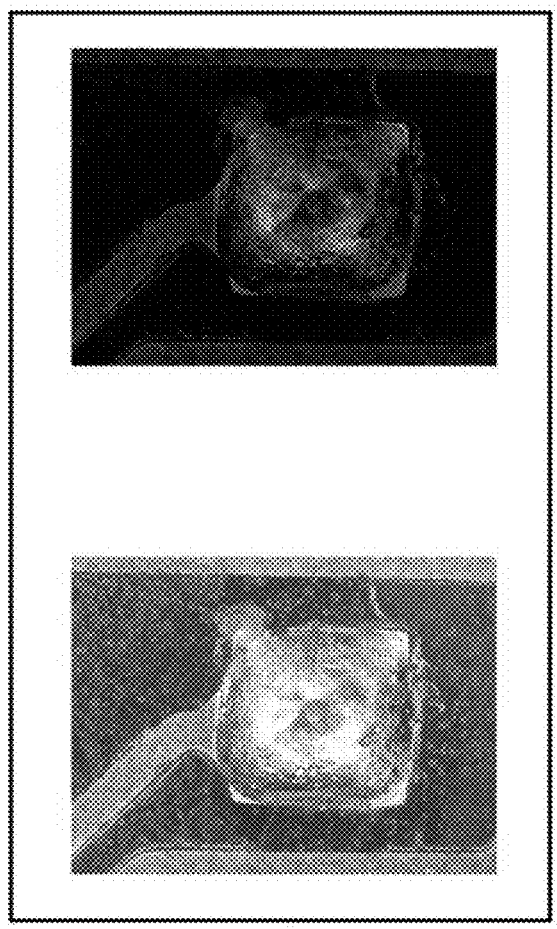
FIGS. 18A and 18B are image views showing low-tone images with different exposure time.
FIG. 18C is an image view showing an HDR image obtained by synthesizing FIGS. 18A and 18B.
Figure 19A:
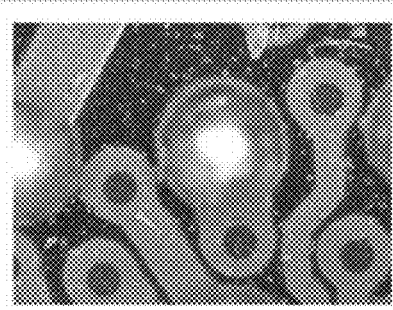
FIGS. 19A to 19D are schematic views showing the situation of synthesizing a depth synthetic image.
Figure 19B:
Figure 19C:
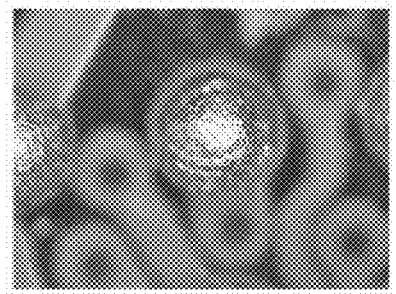
Figure 19D:
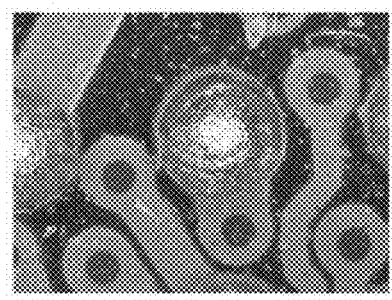

In the dynamic range extension photographing mode, a so-called HDRI is captured. The HDRI (High Dynamic Range Image, hereinafter referred to as an "HDR image") is an image with a dynamic range, namely a ratio between a minimum light amount and a maximum light amount, is significantly higher than that of a conventional image. For example, on a monitor of a standard computer, 8 to 24 bit color is adopted as standard color representation and can be represented by 2.56 to 16.77 million tones, but a larger number of colors exist in reality and human's eyes see them by changing the size of a pupil to adjust brightness to reference brightness that is thought to be suitable. Accordingly, there is used an HDR image exceeding a representation capability of the monitor and the like and rendered with more color information. For acquiring such an HDR image, there can be used a known technique such as synthesizing a plurality of images obtained by capturing images of the same observation target in the same position on different imaging conditions (typically, exposure time of the imaging element). For example, a high-tone HDR image can be obtained by synthesizing a plurality of low-tone images which are captured as a dynamic range of a brightness region is changed. As one example, low-tone images with different exposure time as shown in FIGS. 18A and 18B are synthesized, to generate a high-tone HDR image as shown in FIG. 18C.

Further, as opposed to the above dynamic range extension photographing, it is also possible to perform photographing where a resolution is improved so as to allow display of a fine pattern in a narrow dynamic range. In the resolution improvement photographing mode, images with an imaging condition more finely changed are synthesized in a narrower dynamic range than that of the original image, thereby to obtain a synthetic image with its brightness resolution more improved than that of the original image. It is to be noted that the synthetic image obtained here is not literally an HDR image due to the dynamic range not being extended, but it is a high-tone image similar to the HDR image, and in the present specification, it is to be treated as included in the HDR image for convenience. Further, although the HDR image is used in the meaning that its dynamic range is wider than a dynamic range with which display is possible on the display section in the present specification, but it is not restrictive. The HDR image can also be treated as one that means an image with a wider dynamic range than a dynamic range with which imaging is possible by the imaging element of the imaging section, or one that means an image provided with a specific bit number such as a bit number not smaller than 24 bit or not smaller than 32 bit.

(Depth Synthetic Image)

Further, as a synthetic image, this magnifying observation apparatus can also capture a depth synthetic image in addition to the HDR image by means of the synthetic image generating unit 85. A depth synthetic image is an image obtained in such a manner that, when a height difference of a measurement target portion of the target S exceeds a depth of field, only focused portions are extracted and synthesized from observation images individually captured as made different from each other in the height direction as shown in FIGS. 19A to 19D.

Figure 20:
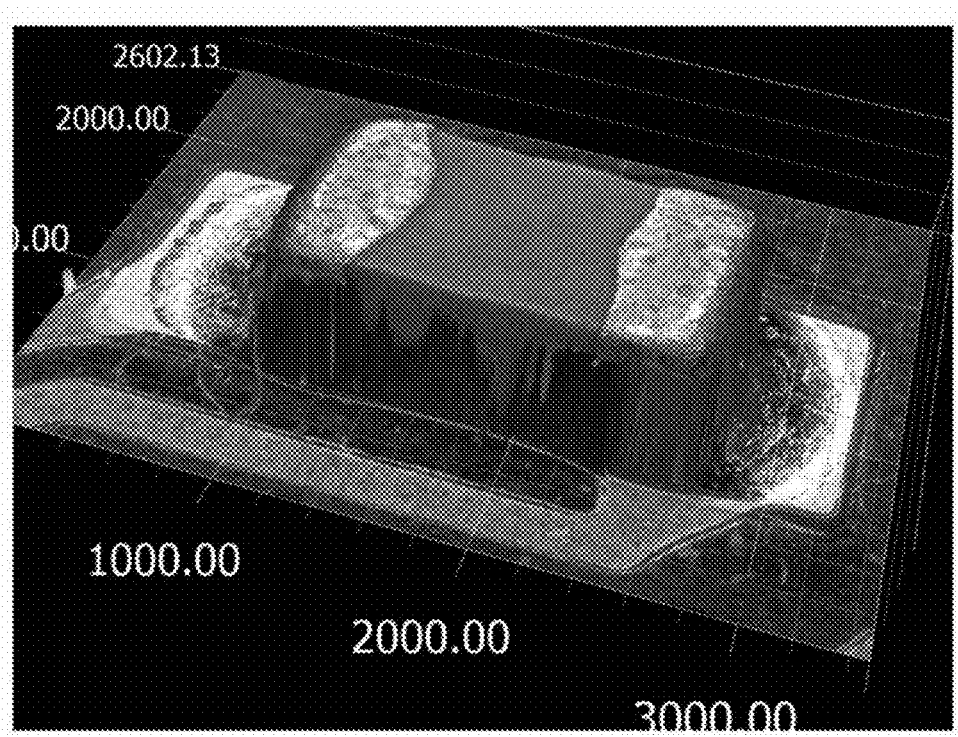
FIG. 20 is an image view showing a three-dimensional image.

Further, as another synthetic image that is synthesized in the synthetic image generating unit 85, a three-dimensional image, a high-resolution image by means of pixel shifting, a super-resolution image, or the like can also be used. The three-dimensional image is obtained by previously storing coordinate information of the z-axis movement mechanism (z stage) at the time of creating a depth synthetic image, and generating a three-dimensional image by use of height information with respect to each pixel, and an image as in FIG. 20 is obtained. Further, the high-resolution image by means of the pixel shifting function is obtained in such a manner that, in the imaging elements in the Bayer array as shown in FIG. 12, 4 positions of 2 rows×2 columns are shifted by 1 pixel to be moved, and images captured in the respective positions are combined. Herewith, it is possible to acquire RGB data at each pixel, so as to obtain a high-resolution image (FIG. 13) without performing Bayer interpolation. Further, by using pixel shifting of sub-pixels at the same time, it is possible to acquire each RGB data while acquiring data between the pixels, so as to obtain a still higher-resolution image (FIG. 14). Moreover, the super-resolution image is formed in such a manner that brightness information is obtained by use of only a specific wavelength component by pixel shifting photographing, to generate a high-resolution image free of an influence of lens aberration and an influence of a long wavelength component. As for this super-resolution image, a plurality of images are photographed by pixel shifting photographing or the like, and an image prior to occurrence of blurring due to the lens is estimated based on a probability distribution model and a point spread function.

Further, it is also possible to acquire a high-resolution color image by use of the image synthesizing unit 85. When observation is performed by means of illumination light with a short wavelength, a high-resolution image can be obtained. By using blue illumination light through use of the above properties and also performing pixel shifting, a high-resolution monochromatic image can be obtained. However, this image only has blue information and is not a full color image. Accordingly, by separately acquiring a full color image by use of white illumination light and superimposing color information (chromaticity, saturation) of the full color image on brightness information of the monochromatic image in the image synthesizing unit 85, it is possible to obtain a high-resolution synthesized color image. That is, by capturing a monochrome high-resolution image by use of an imaging element capable of capturing illumination light with a short wavelength, specifically an imaging element for blue, out of the single-plate imaging elements, and synthesizing the captured image with a separately photographed color observation image, color information can be added to the high-resolution monochrome observation image, so as to obtain a color high-resolution observation image (brightness synthetic image).

(Display Mode Automatically Switching Function)

In the magnifying observation apparatus, after such a synthetic image is displayed, the visual field may be moved or the photographing condition may be changed for further capturing another synthetic image. In such a case, in a conventional practice, it is necessary to perform the forgoing field searching and imaging condition adjustment operation after a first display mode for displaying a still image of the synthetic image is once stopped and the mode is switched to a second display mode for displaying a moving image (a through image or a live picture) on the display section 52. This is because, when the mode remains to be the first display mode, updating of a display content on the display section 52 takes time due to long time being required for generation of one image, and this is not suitable for the field searching, thereby requiring switching of the image to a moving image with a high frame rate that can be drawn in a shorter period of time. Then, when the visual field and the imaging condition are adjusted in the second display mode with a high frame rate to complete setting of a state that allows imaging, this time, the mode is switched to the first display mode, and such operations as re-generation of a synthetic image and displaying of the obtained synthetic image are performed. In such a manner, in the conventional practice, the operation of switching the display mode on the display section from still image display to moving image display is needed every time, to cause a problem of the operation being complicated.

Accordingly, in the present embodiment, there is provided a display mode automatically switching function of automatically switching a screen displayed on the display section 52 to a live picture and displaying it upon detection of any operation (image changing operation) for changing an image such as movement of the visual field or changing the photographing condition in a state where a still image is displayed. Herewith, it is possible to keep displaying the live picture on the display section 52 during movement of the visual field or during the time until the photographing condition becomes stable. Then, upon stopping of the visual field and stabilization of the photographing condition, synthesis processing is automatically executed again, to display a synthetic image. That is, upon detection of stopping of the visual field or decision of the photographing condition, the display mode is automatically switched to the first display mode. With such a configuration, the user can save time and labor for switching the display mode on the display section from a still image to a moving image every time, and an operating environment with good usability is realized.

Figure 21A:
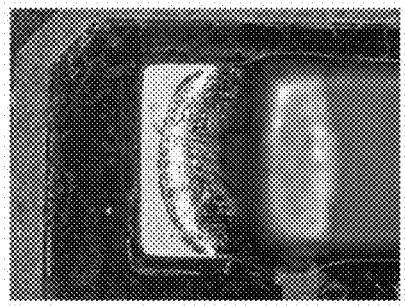
FIG. 21A is an image view showing an image before depth synthesis.
Figure 21B:
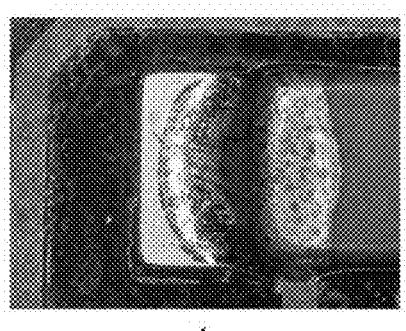
FIG. 21B is an image view showing the situation of displaying the depth synthetic image in a first display mode.
Figure 21C:
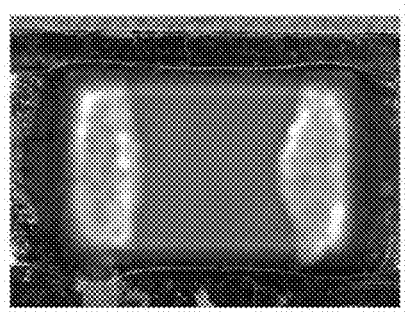
FIG. 21C is an image view showing a second display mode image.
Figure 21D:
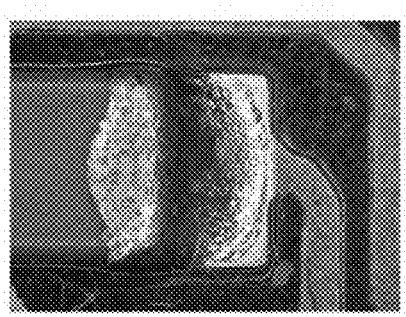
FIG. 21D is an image view showing a first display mode image.

For example, there is considered a state where a depth synthetic image as in FIG. 21B has been obtained by executing depth synthesis on an observation image as in FIG. 21A. At this time, a still image in the first display mode is displayed on the display section 52. When the visual field is moved from this state by the user operating a visual field moving unit (e.g. the xy-axis movement mechanism, the z-axis movement mechanism, etc.) in order to obtain a depth synthetic image in a next visual field, display on the display section 52 is automatically switched to a live picture in the second display mode as shown in FIG. 21C. When the user decides a desired visual field, the display mode is automatically switched to the first display mode, and depth synthesis processing is executed, to obtain a new depth synthetic image as shown in FIG. 21D.

(Display Mode Switching Unit 89e)

Here, the display mode switching unit 89e performs switching between the second display mode and the first display mode on the display section 52. For example, switching from the first display mode to the second display mode is performed upon execution of an image changing operation in an image changing unit. Here, the image changing unit is a unit for accepting an image changing operation of making a change to an image acquired in the imaging unit in a state where a first display mode image subjected to the image processing in the first display mode is displayed on the display section 52. For example, at the stage of detecting an operation of moving the visual field, a display magnification, a working distance or the like performed by the visual field moving unit or at the stage of detecting an operation of adjusting image brightness, a shutter speed or the like performed by an image adjusting unit, the display mode switching unit 89e performs switching from the first display mode to the second display mode.

In contrast, switching from the second display mode to the first display mode is made at the point of completion of the image changing operation by the image changing unit. For example, immediately after movement of the visual field by the visual field moving unit or after a lapse of predetermined time (e.g., about several seconds), the completion is determined.

As thus described, by detecting the image changing operation of making some change to the image acquired in the imaging unit which is performed in the image changing unit including the visual field moving unit and the image adjusting unit, the display mode switching unit 89e automatically executes switching from the first display mode to the second display mode.

Further, switching to the second display mode may be performed not only during movement of the visual field, but the second display mode image may also be displayed during changing of the photographing condition. For example, during the time when the user is manually adjusting brightness of an image displayed on the display section 52 to appropriate brightness, the image is updated as a frame rate is increased as the second display mode, namely a live picture, and switching is thus performed to an image in accordance with a value adjusted in real time, thereby facilitating adjustment. Then, after completion of the adjustment operation, image processing such as synthesis processing is automatically executed, and hence the apparatus can be used without stress.

Here, examples of the photographing condition include adjustment of exposure time (brightness), a gain (brightness), illumination (a light amount and a way of applying light) and the like, and application of a variety of image processing such as edge enhancement, gamma correction and image filter processing. During the adjusting operation for each of these setting items and during execution of image processing, the mode is set to the second display mode, and at the stage of completing the user's adjustment, namely at the stage of stopping input or at the stage of completing execution of an image processing command, synthesis processing applied with these settings and image processing is executed in the image processing unit.

(Display Mode Switching Operation)

Figure 22:
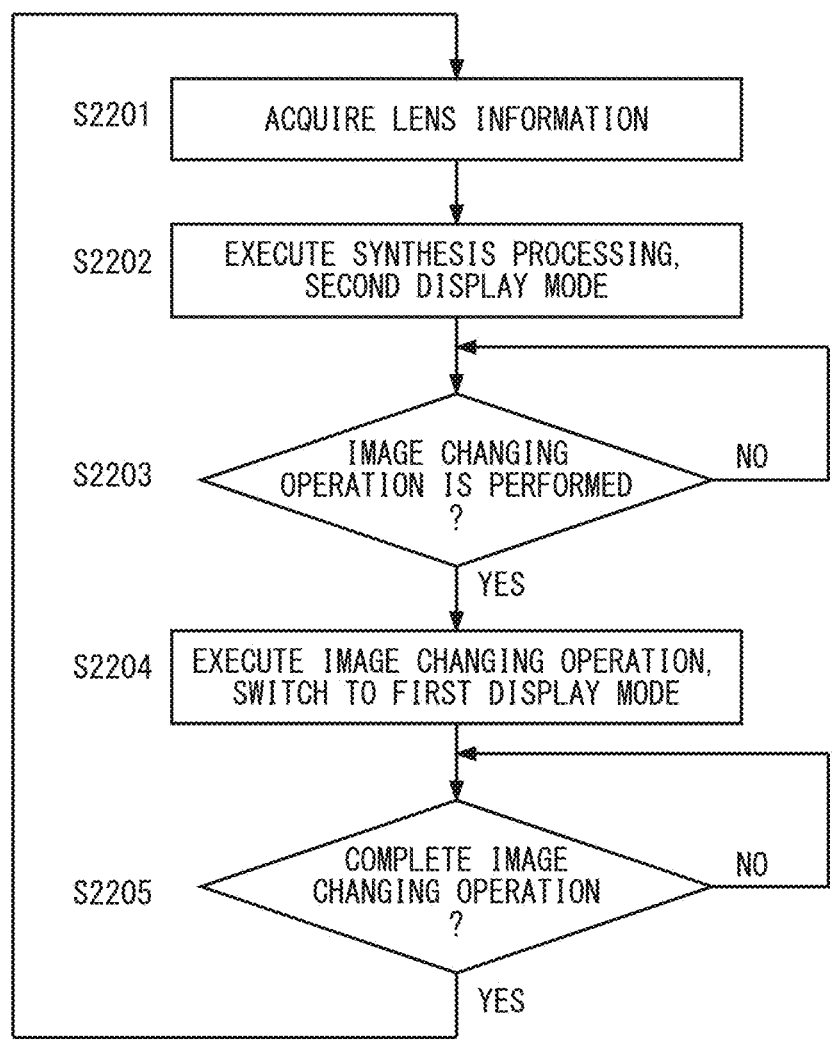
FIG. 22 is a flowchart showing a procedure for switching a display mode.

A procedure for the display mode switching operation by the display mode switching unit 89e will be described based on a flowchart of FIG. 22. First, in Step Sd1, information of the microscope lens section mounted in the camera section is acquired. Examples of the information of the lens include the kind of lens and a magnification. This information is acquired by either automatic recognition or input from the user. In the case of the automatic recognition, lens identification information held on the microscope lens section side can be acquired by being read by the body section through the camera section. In the case of the user input, the user inputs the type of mounted camera section, the attribute thereof or the like with the console or the magnified image observing program or the like.

Next, in Step Sd2, the display mode on the display section 52 is set to the first display mode while synthesis processing is executed. Here, generation and display of the synthetic image are executed as the synthesis processing. Specifically, based on the information of the microscope lens section obtained in Step Sd1, the control unit decides a movement amount and a movement speed of the lens, and acquires a plurality of images while changing a focus position by moving the lens, and the image synthesizing unit executes the synthesis processing. Further, the display mode on the display section 52 automatically becomes the first display mode by the display mode switching unit 89e, and a synthetic image as a still image is displayed as the first display mode image.

Further, the processing further goes to Step Sd3, and it is determined whether or not any image changing operation of changing the image has been performed. Here, it is determined whether or not a visual field moving operation has been performed by the image changing unit, for example, the visual field moving unit such as the xy-axis movement mechanism or the z-axis movement mechanism. When the image changing operation has not been performed, the processing returns to Step Sd3 and is repeated. On the other hand, when the image changing operation has been performed, the processing goes to Step Sd4, and the display mode switching unit 89e switches the display mode from the first display mode to the second display mode, while executing the inputted image changing operation. For example, in the case of movement of the placement section, the display is switched from the still image to a live picture, and the user can check the moving visual field by means of the moving image, and follow changes in image in real time. Further, in Step Sd5, it is determined whether or not execution of the image changing operation has been completed. Here, it is determined whether or not movement of the placement section has been completed, and when it has not been completed, the processing returns to Step Sd5, and comes into a standby state. When the image changing operation is then completed, the processing returns to Step Sd1 to repeat the above loop. It is to be noted that, when there is no change made in the microscope lens section, the processing may skip Step Sd1 to go to Step Sd2. In such a manner, by the display mode being automatically switched to the second display mode upon detection of the image changing operation and switched to the first display mode upon completion of the image changing operation, the user can perform an operation and observation with a suitable display content of the display section 52 without switching the display content, so as to improve the usability.

It should be noted that at the time of the synthesis processing in Step Sd2, movement in the z-direction is not restricted to movement of the microscope lens section by the upper stage lift, but the placement section may be moved by the lower stage lift. Further, a plurality of images may be acquired by changing a focus ring for focus adjustment provided in the microscope lens section to change a focus position. Moreover, as for the movement amount and the movement speed of the microscope lens section, for example when the magnification of the lens is low, the movement amount is made large (a synthesis range is made wide), to make the movement speed high. Furthermore, when the depth of field is small, the movement amount is made small to make the movement speed low, and it is thereby possible to move the placement section such that portions in focus are located well in the z-direction in the respective images.

(Detection of Image Changing Operation)

As for detection of the image changing operation for performing switching from the first display mode to the second display mode such as a live picture, for example in the case of the visual field moving units such as the xy-axis movement mechanism and the z-axis movement mechanism being electrically operated, the display mode on the display section 52 is switched on the timing of the control section issuing a movement order of these units. Further, the display mode is switched from the second display mode to the first display mode upon detection of issuing of a stopping order of the foregoing visual field moving unit or notification of completion of movement in the display mode switching unit 89e, while the image processing such as depth synthesis is automatically executed. Alternatively, a sensor for detecting movement of the placement section can be provided to the placement section and the mode can be set to the second display mode only during the time when the sensor is sensing the movement. By detecting movement in the xyz-directions and the θ-direction, the sensor can execute switching of the display mode in whichever direction the placement section moves.

Further, it is also possible to use a change in image for determination of the start and the end of the image changing operation as thus described. For example, the image processing unit checks a degree of change in image by the image processing, and regards that the movement has been made when the degree of change in image exceeds a certain value. In contrast, when the degree of change becomes smaller than the certain value, it is determined that the movement has been stopped. As a parameter for determining the degree of change in image, for example, there is used the amount of change in brightness between frames or the amount of movement of a characteristic point. When this method is used, a member relating to the image changing unit need not be electrically operated, but can be manually operated. For example, since it is not necessary to incorporate the motor and the sensor onto the x-y stage as the xy-axis movement mechanism, there can be obtained an advantage of reducing manufacturing cost and simplifying the configuration.

Further, the visual field moving operation includes not only movement of the visual field toward the xy-directions by the xy-axis movement mechanism described above, but also rotational movement toward the θ-direction by the rotational movement mechanism, movement toward the z-direction by the z-axis movement mechanism, adjustment of the focused position, enlargement/reduction of the visual field and adjustment of the magnification such as switching of the objective lens. Further, such a visual field moving operation also includes inclination of the head section 4 by the head inclining mechanism 44. For example, in the magnifying observation apparatus shown in FIG. 10, when an angle sensor is provided and an inclination operation by the head inclining mechanism 44 is detected, synthetic image generating processing can be executed while the display is switched to display in the second display mode (live image) during an inclination operation and to display in the first display mode (still image) after completion of the inclination.

Further, in addition to the depth synthetic image as described above, the synthetic image synthesized in the synthetic image generating unit 85 can be an HDR image, a three-dimensional image having height information, a high-resolution image by means of the pixel shifting function, a super-resolution image, or the like. In the image synthesis processing for generating such a synthetic image, it is of necessity to capture a plurality of images and processing these. Since it thus takes certain time to generate a synthetic image, real time display is difficult, and generally, a synthetic image is displayed as a still image or displayed with its frame rate made extremely slow. However, it is inefficient to search a portion to be observed in the first display mode with a slow frame rate as thus described. Accordingly, it is configured such that, at the time of searching the visual field, namely at the time of the image changing operation being performed, display with a low load is possible and the display is thus performed in the second display mode capable of also improving the frame rate, and after decision of the visual field, switching is performed to the first display mode as described above.

However, in the present invention, the second display mode is not necessarily restricted to the live picture, but it may, for example, be updated display of a simple synthetic image obtained by simplifying the synthesis processing and generating a simple synthetic image that can be generated in a shorter period of time than normal synthesis processing so as to be updated at a certain level of frame rate. For example, during movement of the visual field or during changing of the photographing condition, although switching is performed to the second display mode, a live picture is not used and, while the image synthesis processing is performed in the second display mode, a simple synthetic image is synthesized by simplifying this synthesis processing itself, whereby it is possible to make the frame rate faster than that of a normal synthetic image and facilitate movement toward an object portion. As simple image processing executed in the first display mode in which such a simple synthetic image is displayed, it is possible to use image processing where the number of images photographed is reduced. For example, in the case of a simple depth synthetic image, a photographing pitch between original images is set wide, and the number of images photographed which is necessary for synthesizing one simple depth synthetic image is reduced. Further, in the case of an HDR image, the number of images photographed can as well be reduced by setting a large difference in exposure time between original images. By reducing the number of images photographed which are necessary for image synthesis, it is possible to suppress a decrease in frame rate and facilitate searching of the object portion. By reducing the number of images photographed by this method, despite a quality of the simple synthetic image being slightly degraded, the image can be sufficiently used for the application of searching the object portion, and a more efficient operation can be performed by placing a higher priority on improvement in frame rate over the quality of the simple synthetic image.

Similarly, the first display mode is not necessarily restricted to a still image, but it can be a synthetic image with a slow frame rate. Observation like this can be used especially in such an application where the visual field is not frequently changed and such an application where even a large influence of an afterimage is not problematic. As thus described, in the present invention, the first display mode is not restricted to a still image subjected to image processing and the second display mode is not restricted to a live picture. It is sufficient just to make the frame rate of the second display mode faster than the frame rate of the first display mode, and in accordance with a balance between the image changing operation and the image processing, the frame rate in each display mode and the processing content can be adjusted as appropriate based on an observation application or the like.

Further, although the image processing for generating a synthetic image in the image synthesizing unit has been described as the first display mode in the above example, the first display mode is not restricted to generation of a synthetic image, and it may be another image processing. Examples thereof include auto focusing, edge enhancement, storage processing for obtained image data, and measurement processing on an image.

(Measurement Processing)

Figure 23A:
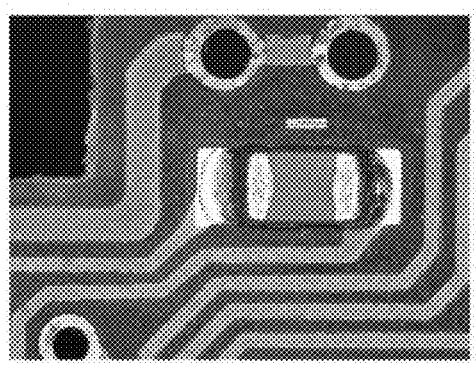
FIGS. 23A to 23C are image views showing the situation of performing automatic measurement processing.
Figure 23B:
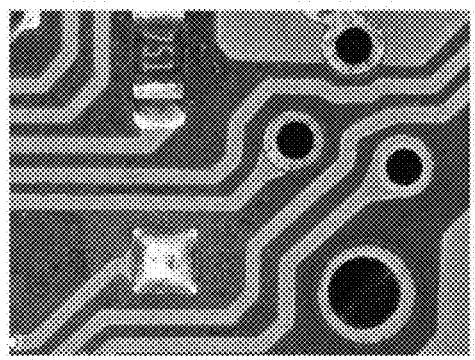
Figure 23C:
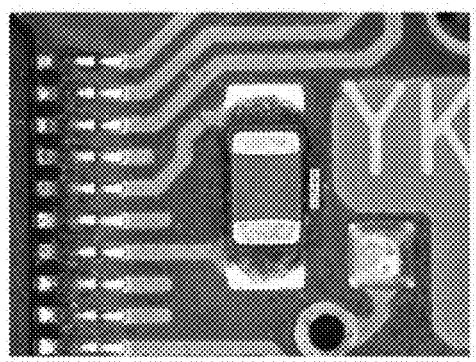

In the measurement processing, for example, a measurement position is previously designated with respect to a photographed image, teaching data is created which stores a partial image including the measurement position and a relative position of the measurement position to the partial image, and an attitude/position of a portion matching with the teaching data is specified from a new captured image, to execute measurement recorded in the teaching data. For example, at the time of previously acquiring a partial image including a measurement position as shown in FIG. 23A by means of the teaching data, the first display mode is set. Then, switching is performed to the second display mode (a live picture of FIG. 23B) during movement of the visual field, and pattern matching is performed after the movement. At the time of automatically performing the measurement processing, switching is performed to the second display mode as shown in FIG. 23C. In such a manner, by stopping the automatic measurement processing during movement of the visual field and performing automatic measurement after decision of the visual field, the user can perform measurement only by the operation of moving the visual field without performing an on/off operation for automatic measurement every time, thus leading to realization of an environment excellent in operability.

As described above, according to the magnifying observation apparatus according to the present embodiment, after a synthetic image with a large depth of focus is once generated and displayed, the display content on the display section 52 is automatically switched to a live picture to be displayed upon detection of movement of the visual field. Accordingly, the user searches an object portion while viewing the live picture, to determine the visual field. Subsequently, the depth synthesis processing is automatically performed upon sensing of completion of movement of the visual field, and a depth synthetic image is displayed. Herewith, the user can search the object portion by viewing the live picture with a fast frame rate, and can automatically observe the image with a large depth after determining the object portion, so as to save time and labor for turning on/off a synthesis mode and realize an efficient observation.

A magnifying observation apparatus, a magnified image observing method, a magnified image observing program, and a computer-readable recording medium according to the present invention can be preferably used for a microscope, a digital microscope of a reflection type, a transmission type or the like, a digital camera, or the like. Further, in the case of applying the present technique to a fluorescence microscope, reflected light or transmitted light from an observation target with respect to illumination light can be replaced with excitation light.

What is claimed is:

1. A magnifying observation apparatus comprising:
a placement stage having a placement surface for placing an observation object;
a light source configured to irradiate the observation object with illumination light;
an imaging unit including a camera and a lens, having an optical axis, and configured to sequentially acquire an observation image of the observation object;
a z-axis stage lift configured to change a relative distance between the placement stage and the imaging unit along a first direction orthogonal to the placement surface or in parallel with the optical axis;
an xy-axis movable coupling configured to change a relative lateral position of the placement stage and the imaging unit along a second direction in parallel with the placement surface;
a display configured to display an image with respect to the observation image; and
a controller operably coupled to the imaging unit and the display, configured to:
synthesize the observation image sequentially acquired to generate an enhanced observation image,
in a first display mode, control the display to display the enhanced observation image,
in a second display mode, control the display to display, at a higher update rate than the first display mode, the observation image sequentially acquired by the imaging unit or a simple processed observation image generated by processing the observation images simpler than synthesizing the observation images to generate the enhanced observation image,
detect a change with respect to the observation image acquired by the imaging unit,
determine an end of the change with respect to the observation image acquired by the imaging unit,
switch from the first display mode to the second display mode in response to the change detected by the controller in the first display mode, and
switch from the second display mode to the first display mode in response to the end of the change determined by the controller in the second display mode.

2. The magnifying observation apparatus according to claim 1, wherein
the enhanced observation image is displayed as a moving image at a first frame rate in the first display mode, and
the observation image acquired by the imaging unit or the simple processed observation image is displayed as a moving image at a second frame rate which is higher than the first frame rate in the second display mode.

3. The magnifying observation apparatus according to claim 1, wherein the enhanced observation image is displayed as a still image in the first display mode, and the observation image acquired by the imaging unit or the simple processed observation image is displayed as a moving image in the second display mode.

4. The magnifying observation apparatus according to claim 1, wherein the change with respect to the observation image includes an image changing operation including at least one of a relative movement operation between the placement stage and the imaging unit, a relative rotation operation between the lacement stage and the imaging unit, an inclination operation for the imaging unit with respect to the placement stage, a changing operation of an imaging condition with respect to acquiring an observation image, and a changing operation of an image processing condition with respect to processing an observation image by the controller.

5. The magnifying observation apparatus according to claim 1, wherein the change with respect to the observation image includes an image changing operation including at least one changing operation for a shutter speed with respect to the imaging unit, a exposure time with respect to the imaging unit, a gain with respect to the observation image acquired by the imaging unit, a white balance with respect to the imaging unit, a size of an image with respect to the observation image acquired by the imaging unit and a kind of illumination light from the light source.

6. The magnifying observation apparatus according to claim 1, wherein the change with respect to the observation image includes a changing of a visual field including at least one of a relative movement between the placement stage and the imaging unit, a relative rotation between the placement stage and the imaging unit and an inclination of the imaging unit with respect to the placement stage.

7. The magnifying observation apparatus according to claim 1,
wherein the change with respect to the observation image includes a changing of a visual field including a movement operation by utilizing at least one of the z-axis stage lift and the xy-axis movable coupling.

8. The magnifying observation apparatus according to claim 1, further comprising:
a magnification adjusting unit configured to increase or decrease a magnification of the observation image acquired by the imaging unit,
wherein the change with respect to the observation image includes an image changing operation including a magnification changing operation by the magnification adjusting unit.

9. The magnifying observation apparatus according to claim 1, wherein
the enhanced observation image is generated by synthesizing the plurality of observation images each acquired at a different relative lateral position and/or a relative distance by using the z-axis stage lift and/or the xy axis movable coupling.

10. The magnifying observation apparatus according to claim 9, wherein the enhanced observation image includes at least one of a depth synthetic image, a 3D synthetic image, a pixel shifting image, a super-resolution image and a high dynamic range (HDR) image.

11. The magnifying observation apparatus according to claim 9, wherein
the simple processed observation
image is generated on simpler synthesizing processing than the enhanced observation image by the controller.

12. The magnifying observation apparatus according to claim 1, further comprising:
a first objective lens section having a first magnification;
a second objective lens section having a higher magnification than the first magnification; and
an objective lens switching unit configured to switch one of the first objective lens section and the second objective lens section to a position matched with an optical axis of the imaging unit,
wherein the change with respect to the observation image includes an image changing operation including an operation of switching the objective lens.

13. The magnifying observation apparatus according to claim 1, further comprising:
a head inclining mechanism capable of inclining the imaging unit with respect to the placement stage in a vertical plane,
wherein the change with respect to the observation image includes an image changing operation including an operation of inclining the imaging unit by the head inclining mechanism.

14. A magnified image observing method for a magnifying observation apparatus comprising a placement stage having a placement surface for placing an observation object, an imaging unit configured to sequentially acquire an observation image of the observation object, and a controller operably coupled to the imaging unit, the method comprising:
sequentially acquiring, via the imaging unit, an observation image of an observation object;
generating an enhanced observation image by synthesizing the observation images;
displaying, via the display, the enhanced observation image in the first display mode;
detecting, via the controller, a change with respect to the observation image acquired by the imaging unit;
switching from the first display mode to the second display mode in response to the change detected by the controller in the first display mode;
displaying, at a higher update rate than the first display mode, a second image in the second mode, the second image being the observation image sequentially acquired by the imaging unit or a simple processed observation image generated, via the controller, by processing the observation images simpler than the generating an enhanced observation image by synthesizing the observation images;
determining, via the controller, an end of the change with respect to the observation image acquired by the imaging unit; and
switching from the second display mode to the first display mode in response to the end of the change determined by the controller in the second display mode.

15. A non-transitory computer-readable recording medium or a recording device, in which a magnified image observing program for a magnifying observation apparatus comprising a placement stage having a placement surface for placing an observation object, an imaging unit configured to sequentially acquire an observation image of the observation object, and a controller operably coupled to the imaging unit,
wherein the program causes a computer to realize the functions of:
sequentially acquiring, via the imaging unit, an observation image of an observation object;
generating an enhanced observation image by synthesizing the observation images;
displaying, via the display, the enhanced observation first image in the first display mode;
detecting, via the controller, a change with respect to the observation image acquired by the imaging unit;
switching from the first display mode to the second display mode in response to the change detected by the controller in the first display mode;
displaying, at a higher update rate than the first display mode, a second image in the second mode, the second image being the observation image sequentially acquired by the imaging unit or a simple processed observation image generated, via the controller, by processing the observation images simpler than the generating an enhanced observation image by synthesizing the observation images;
determining, via the controller, an end of the change with respect to the observation image acquired by the imaging unit; and switching from the second display mode to the first display mode in response to the end of the change determined by the controller in the second display mode.

\* \* \* \* \*

UNITED STATES PATENT AND TRADEMARK OFFICE
CERTIFICATE OF CORRECTION

PATENT NO. : 9,690,088 B2  
APPLICATION NO. : 14/551101  
DATED : June 27, 2017  
INVENTOR(S) : Karube et al.

Page 1 of 1

It is certified that error appears in the above-identified patent and that said Letters Patent is hereby corrected as shown below:

In the Claims

Claim 4, Column 30, Line 58, "lacement" should read --placement--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*